United States Patent [19]
Ortiz

[11] Patent Number: 5,359,540
[45] Date of Patent: Oct. 25, 1994

[54] COMPUTER ASSISTED ELECTRIC POWER MANAGEMENT

[76] Inventor: Hugo Ortiz, c/o 3218 Kennelworth La., Bonita, Calif. 91902

[21] Appl. No.: 7,017

[22] Filed: Jan. 21, 1993

Related U.S. Application Data

[63] Continuation of Ser. No. 557,158, Jul. 23, 1990, abandoned.

[51] Int. Cl.$^5$ .................. G06F 15/20; H02B 1/02
[52] U.S. Cl. .................. 364/492; 307/115; 364/480; 364/483
[58] Field of Search .......... 364/DIG. 1, DIG. 2, 364/492, 483, 141, 579, 480, 493; 340/310 A, 310 R, 825.71; 307/38, 115; 361/88; 395/101, 114, 275

[56] References Cited

U.S. PATENT DOCUMENTS

| | | | |
|---|---|---|---|
| 4,204,249 | 5/1980 | Dye et al. | 364/492 X |
| 4,312,035 | 1/1982 | Greene | 364/200 |
| 4,357,665 | 11/1982 | Korff | 364/492 |
| 4,368,394 | 1/1983 | Naimer | 307/115 |
| 4,418,333 | 11/1983 | Schwarzbach | 340/310 A |
| 4,484,258 | 11/1984 | Miller et al. | 364/141 |
| 4,535,401 | 8/1985 | Penn | 340/310 R X |
| 4,593,349 | 6/1986 | Chase et al. | 364/492 |
| 4,623,967 | 11/1986 | Naimer | 364/483 |
| 4,635,222 | 1/1987 | Tokui et al. | 364/900 |
| 4,647,721 | 3/1987 | Busam et al. | 379/102 |
| 4,674,031 | 6/1987 | Siska et al. | 364/492 X |
| 4,675,537 | 6/1987 | Mione | 307/38 |
| 4,685,023 | 8/1987 | Heaston | 361/88 |
| 4,698,517 | 10/1987 | Tohya et al. | 364/492 X |
| 4,747,041 | 5/1988 | Engel et al. | 364/200 |
| 4,771,185 | 9/1988 | Feron et al. | 364/492 X |
| 4,777,607 | 10/1988 | Maury et al. | 364/492 |
| 4,794,525 | 12/1988 | Pickert et al. | 364/200 |
| 4,823,280 | 4/1989 | Mailandt et al. | 364/483 X |
| 4,835,706 | 5/1989 | Asahi | 364/492 |
| 4,916,628 | 4/1990 | Kugler | 364/492 |
| 4,977,515 | 12/1990 | Rudden et al. | 364/492 |

OTHER PUBLICATIONS

Packard Bell: Packmate User's Manual (Oct. 1988); Parallel Port Connector Pin Assignments & Descriptions; p. H-9.
"Smarthome I", Heathkit Catalog (Spring 1987) pp. 22-23.
Laverty Systems, Inc. PowerOnOff, PowerOff. 1989 advertisement in Computer Buyers Guide, 1990-04.
Niche Tek Auto-On. Advertisement in JDR Microdevices 1990 catalog, PC-FAX96.
Radio-Electronics, L. Steven Cheairs, A Byte of Power, Nov. 1980, pp. 65-70.

*Primary Examiner*—Kevin J. Teska

[57] ABSTRACT

Methods and electric power control apparatus connected to a parallel port of a computer. The methods and apparatus permit sharing the parallel port with a printer and allow computer power off without being disturbed. The apparatus transmits status information back to the computer and also reacts to a signal from a timer, a telephone call, user switch, etc. The apparatus is also used for powering on and powering off connected equipment automatically.

18 Claims, 9 Drawing Sheets

COMPUTER ASSISTED ELECTRIC POWER MANAGEMENT

This is a continuation of Ser. No. 07/557,158 filed Jul. 23, 1990, now abandoned.

BACKGROUND OF THE INVENTION

1. Field of the Invention

This invention relates in general to devices that control electric power flow. In particular to such devices that are computer controlled.

2. Description of Prior Art

A computer controlled power strip was needed on Dec. 31, 1988. At that occasion a quick and easy means for programmed activation or deactivation of electrical lights and appliances was wanted. It was to be used for setting up a show to entertain and signal the beginning of the New Year. Over time this idea evolved, it was realized that the same computer that is used to process information also could be used to carry out the chore of turning on and off the equipment around it. Not that it is difficult to push a power switch on the equipment (e.g., printer) to be used, it is that pushing it distracts us or we often just forget to do it. There had to be a better way of managing this. For the following year's end a prototype was used to set up a show and, upon noticing that such product was still unrealized, a decision was made to develop and patent this invention expressed in it's present preferred form.

The term "Computer Assisted" is used in the title because a computer is to be the main actuator in lieu of the human operator using any of the user switches. But also any other device capable of sending an appropriate logic signal, like the one generated by the hand at the switch, has the ability to operate it's power switching action. And it is this flexible, easily controlled switching action that allows us to manage the flow of electric power to any device connected to an outlet of this apparatus.

The term "Printer" is meant to include any device that interfaces it's signals with a computer's port in the same way.

In order to provide background information so that the invention may be completely understood and appreciated in its proper context, reference may be made to a number of prior patents and known art as follows:

The Heaston U.S. Pat. No. 4,685,023 discloses a "POWER LATCH CIRCUIT FOR COMPUTER SELF DEACTIVATION" that does only that. It has no provisions to switch on or off any other device besides the computer controlling it.

There are some computers (e.g., Macintosh, Apple Computer Inc.) that can be programmed to power off or on. This feature is used for controlling the power to the computer only, possibly in conjunction with above cited power latch, and therefore are limited in the same way. My invention is able to switch on or off electrical power to any connected device and, if the computer happens to be a connected device, also will allow self deactivation.

I also have recent knowledge of a product by Laverty Systems, Inc. of Charlottesville, Va. ( 1-800-879-7693). It has some similarities with one embodiment of my invention: manual and computer control, the sharing of the port with another device and telephone line activation, but, again naming a few, does not provide: computer control to turn on the outlet, independent control of the outlet connectors, reporting to the user or software the status of the outlet, automatic power on and off for a printer, etc.

The Mione U.S. Pat. No. 4,675,537 discloses a "CURRENT CONTROLLED ON/OFF POWER LINE SWITCHING OF ELECTRICAL DEVICES" Although intended to switch on or off the flow of electric power to other devices, it does not allow independent control of the output terminals (power outlets' connectors) nor does it allow for computer control of them.

The Naimer U.S. Pat. Nos. 4,368,394 and 4,623,967 disclose "A COMPUTER-CONTROLLED SWITCHING APPARATUS for controlling power switching elements, wherein a microprocessor is connected by way of analog-digital converter means to at least one sensor for detecting the current consumption of the apparatus to be monitored, . . ." These two inventions were conceived and designed primarily for a programmed management of power, specifically to handle the unattended protection of the device being monitored and not for the off/on switching of the power to the device. My invention allows immediate management of the power, through user switches or other device (e.g., a telephone ring signal), and also said programmed management, by signals from the computer or other device (e.g., a timer alarm), to switch on or off the electrical power to a device.

The Greene U.S. Pat. No. 4,312,035 discloses an "APPARATUS FOR CONTROLLING ELECTRICAL POWER IN A DATA PROCESSING SYSTEM" that allows the computer to start a power up sequence or to disconnect all switches at once. It does not allow the computer to turn on or off individual switches.

The Engel et al U.S. Pat. No. 4,747,041 discloses an "AUTOMATIC POWER CONTROL SYSTEM WHICH AUTOMATICALLY ACTIVATES AND DEACTIVATES POWER TO SELECTED PERIPHERAL DEVICES BASED UPON SYSTEM REQUIREMENT" has some desirable features but, to name one, it does not have provisions for manually switching on or off power to any of the controlled devices. An example where such feature is necessary is in the case where the command source (computer) used the invention to power down itself. It could not be powered up again unless a user switch is provided in the invention to override this condition. Likewise, provisions to immediately turn off devices are necessary should a person need to turn a device(s) off at a moment's notice without resorting to pulling the plug. Also, manual operation will aid and comfort the user getting accustomed to automatic and programmed power switching.

The above cited U.S. Pat. 4,747,041, the Dye et al U.S. Pat. No. 4,204,249 and the Miller et al U.S. Pat. No. 4,484,258 disclose arrangements that use an elaborate service subsystem (computer) and a bus(es) dedicated exclusively to the task of controlling the power. With my invention there is no need for a dedicated bus because it can use the printer line of an existing computer. These results are achieved with simpler equipment and, what is more important, less cost.

The Pickert et al U.S. Pat. No. 4,794,525 discloses an "EXTERNAL INTERFACE CONTROL CIRCUITRY FOR MICROCOMPUTER SYSTEMS" that allows the activation of an external device when required by the computer but, because of it's purpose of protection, also does not allow manual operation nor implements the objects of my invention.

The Busam et al. U.S. Pat. No. 4,647,721 discloses a "TELEPHONE ACTIVATED POWER CONTROLLER" that also uses one of many outlet to detect power use and switches on the other outlets under such occurrence. This feature is very similar to the aforesaid Mione U.S. Pat. No. 4,675,537. It allows connection to a parallel port but does not share the port with a printer like my invention. It cannot give the computer information about the status of a particular outlet because most outlets are switched together. Individual outlets cannot be controlled by the computer. My invention can do everything this device does and more.

A BYTE OF POWER, Radio Electronics, November 1980 shows a power controller to be used with a parallel port of a computer. It is an implementation that cannot share the port with a printer. Furthermore, it requires two parallel ports to implement the use of an enable signal.

Whatever the precise merits, features and advantages of the above cited references, none of them achieves or fulfills the purposes of the present invention.

SUMMARY OF THE INVENTION

A principal object of this invention is to provide a means to manage more precisely the flow of electric power used in a computer environment.

It is another principal object to allow more than one governing signal source in said management.

Still another principal object is to accomplish the first two without much bigger expense in: equipment, setup, learning it's use.

To implement some of the principal objects, other objects to be accomplished, sometimes in more than one way, are:
 To turn any of the apparatus's outlets on,
 To turn any of the apparatus's outlets off,
 to obtain from the apparatus the status of the outlets,
 Visually display the meaning and status of the outlets,
 Produce a particular sound according to the function performed,
 Make these operations and information available to an application program,
 Receive and handle a hardware interrupt request,
 Automatically turn on and off an outlet for a printer,
 Interface with a computer without arresting the use of it's ports with a printer.

These objects, as well as other objects that will become apparent from the discussion that follows, are achieved, according to the present invention, by attaching to a computer an apparatus with electrical power outlets that independently switch in response to control signals from: user switches, the computer, other devices (telephone ring signal, timer alarm, etc.) and on demand transmit to the computer logic status and hardware interrupt signals.

To the outlets' connectors of this apparatus the various equipment to be managed are plugged in with their power switches turned on and this apparatus is connected to an appropriate electric power source. Also, the power chord of the controlling computer is normally connected to the first outlet.

With this arrangement a process is started by using the user switch that turns on the first outlet. Once powered up the computer should be suitably programmed with a memory resident routine or program, and commands to control the various power outlets are used from the keyboard or imbedded in user programs. The programs also anticipate or respond to power needs and act accordingly. Programs can also receive an external signal in the form of a hardware interrupt.

DESCRIPTION OF THE PREFERRED EMBODIMENT

Figure 1:
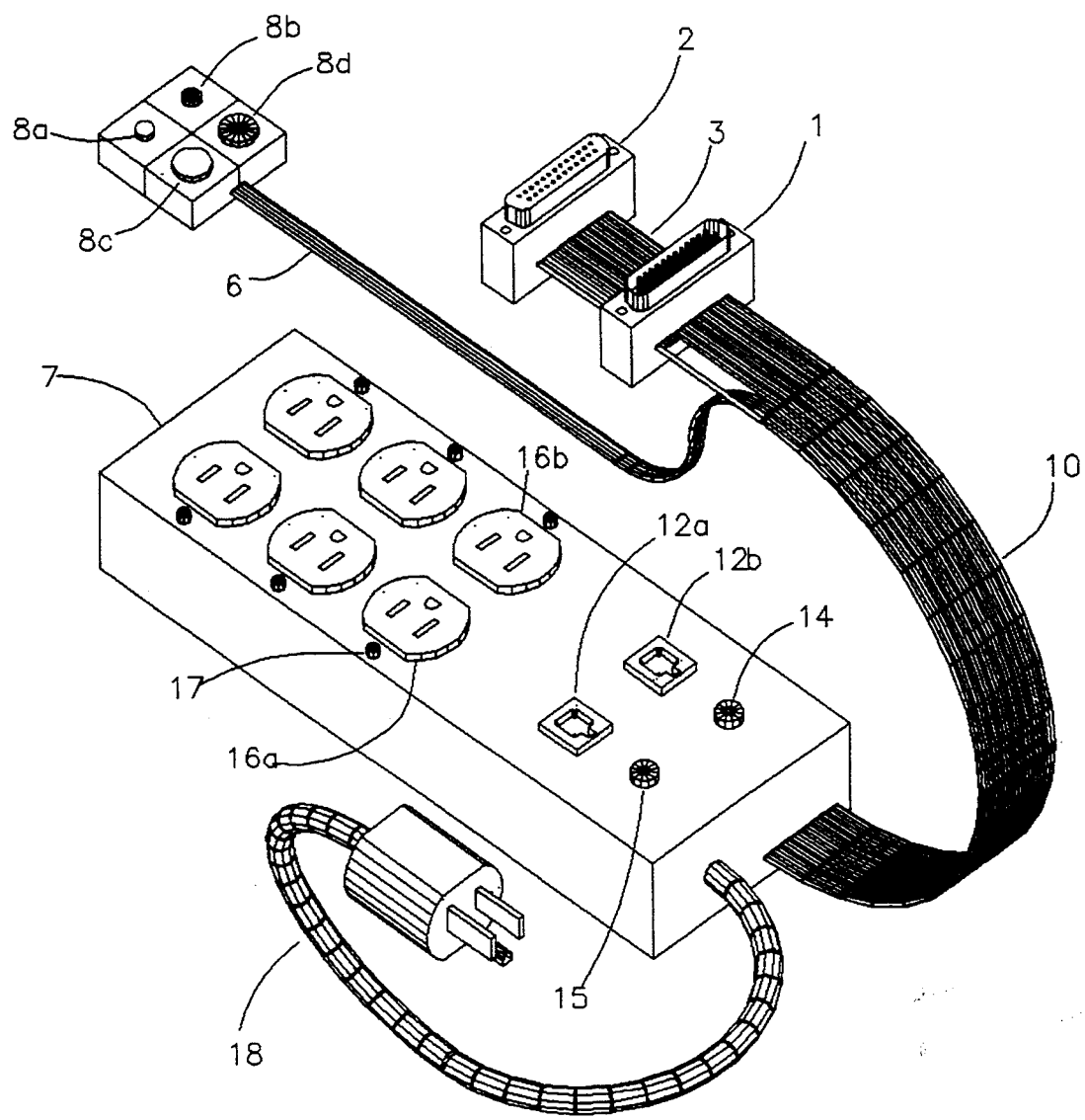
FIG. 1 Is a perspective view of an external housing for the logic and power control circuits along with cable assemblies.

Referring to FIG. 1, which is an overall perspective of a preferred external embodiment of the invention, the power cable 18 is a three conductor cable with an appropriate connector to plug to a standard 120 VAC grounded electric energy source. This energy source is distributed by this apparatus through a plurality of standard 120 VAC grounded outlet connectors (e.g., 16a) and provides power for the logic circuits.

Phone connectors 12a, 12b are telephone jacks interconnected to conduct a phone line electrical signal with provisions to extract the phone's ring signal.

Independent device connector 14 is any two contact jack to accommodate a logic signal from a separate device, such as a signal from a timer alarm.

Hardware interrupt connector 15 is any two contact jack to accommodate an external interrupting logic signal such as that from an UPS informing of a blackout.

A light emitting diode (e.g., 17) is present for a direct visible report of the power status of each outlet connector (e.g., 16a).

Besides providing physical support for the connectors, the housing 7 should help keep any interference (EMI, RFI, ESD) under control. Here it is made of formed metal and connected to electrical ground. Appropriate openings are made to allow the various connectors, leds and cables through. The location of these openings can be different than the arrangement shown but the ones for the leds (e.g., 17) should be close to their related outlet connector (e.g., 16a) or arranged in an orderly manner so each led is identified with an outlet.

User switches 8a, 8b, 8c, 8d are single contact, push actuated, momentary, physically grouped, independent switches. They are labeled distinctively to denote their function. In this embodiment switch 8a turns on the first two outlets and their connectors 16a, 16b. Switch 8b turns off the first two outlets and their connectors 16a, 16b. Switch 8c turns on all outlets and their connectors (e.g., 16a), and switch 8d turns off all outlets and their connectors (e.g., 16a).

Control cable 10, which is a computer interface means for connecting the governing circuits of the outlets to each of the user switches and to a controlling computer, is made by separating, for a length of about two feet, a group of five adjacent conductors from the rest of an approximately six foot, twenty-five conductor, ribbon cable. This forms the user switch section 6 of the cable. To the end of this narrow section said user switches are attached.

Figure 2:
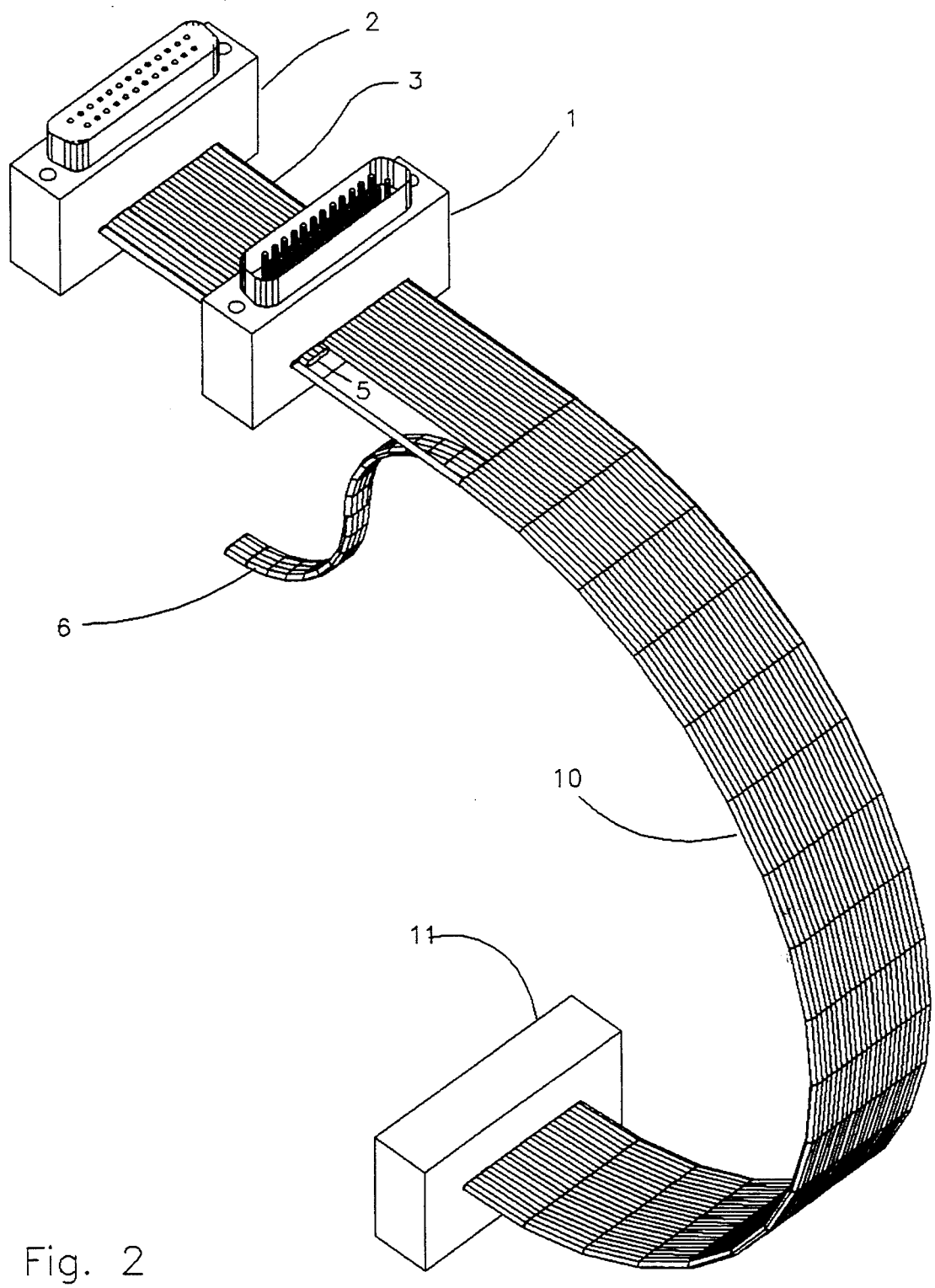
FIG. 2 is a perspective view focusing on the control cable assembly for the apparatus shown in FIG. 1.

Now making reference to FIG. 2, using a five conductor strip of ribbon cable 5 to replace the separated section 6, twenty-five contact, male 1 and female 2, D-Subminiature connectors are attached about two inches apart at approximately one inch from the formed junction towards the divided ends. Excess of the divided end of cable is cut. Corresponding contacts of the D-Subminiature connectors are connected by this short section 3 of cable and contacts number one are aligned with the number one conductor of the cable. To the undivided end of the control cable 10 a twenty-six contact socket connector 11 is attached, again aligning contact number one with the number one conductor of this ribbon cable.

The length of these sections of cable can be decreased or increased to accommodate preferences and attention should be paid to the stray interference that may be encountered. In some cases shielding for these and the user switches, or other means of arresting interference, will be necessary. Perhaps the number of logic ground conductors will be an influencing factor.

Figure 3:
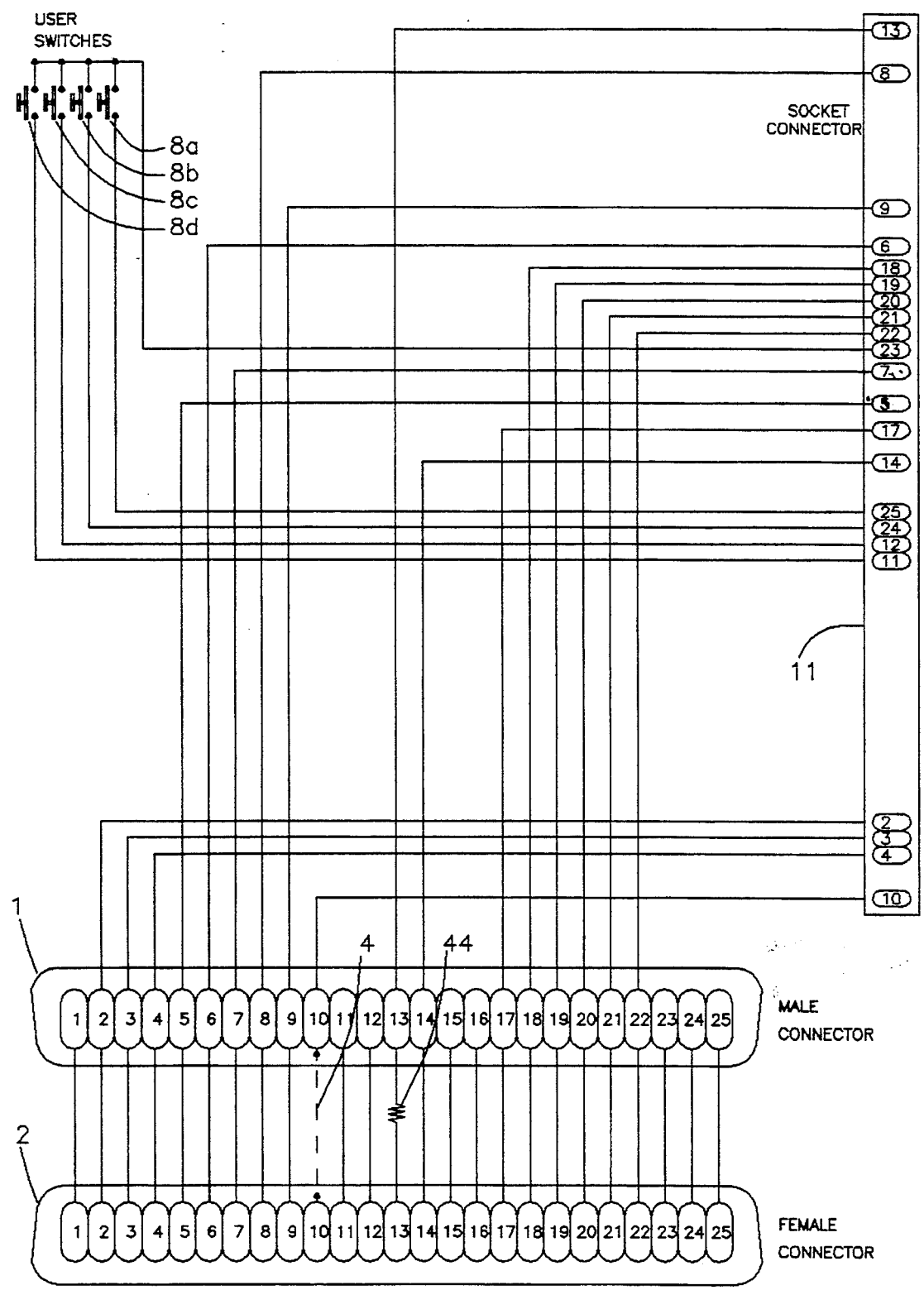
FIG. 3 is the wiring diagram of the control cable assembly shown in FIG. 1 and FIG. 2.

Making reference to the wiring diagram in FIG. 3, it shows that not all contacts need to be continued from the male connector 1 to the socket connector 11, but due to the use of ribbon cable all conductors are maintained. Also, in order to limit the transmission to the parallel port of hardware interrupt signals to ones coming from the socket connector 11, number ten conductor 4 is cut or removed where shown. A resistor 44 in the signal path of pin thirteen of the female connector is necessary when sharing the parallel port with devices that hold this line low, which is not the case of a printer that normally biases this line high.

User switches 8a, 8b, 8c, 8d receive a common ground (low) signal through conductor twenty-three and upon pressure return a low signal through their respective conductors: twenty-five, twenty-four, twelve and eleven.

Figure 4:
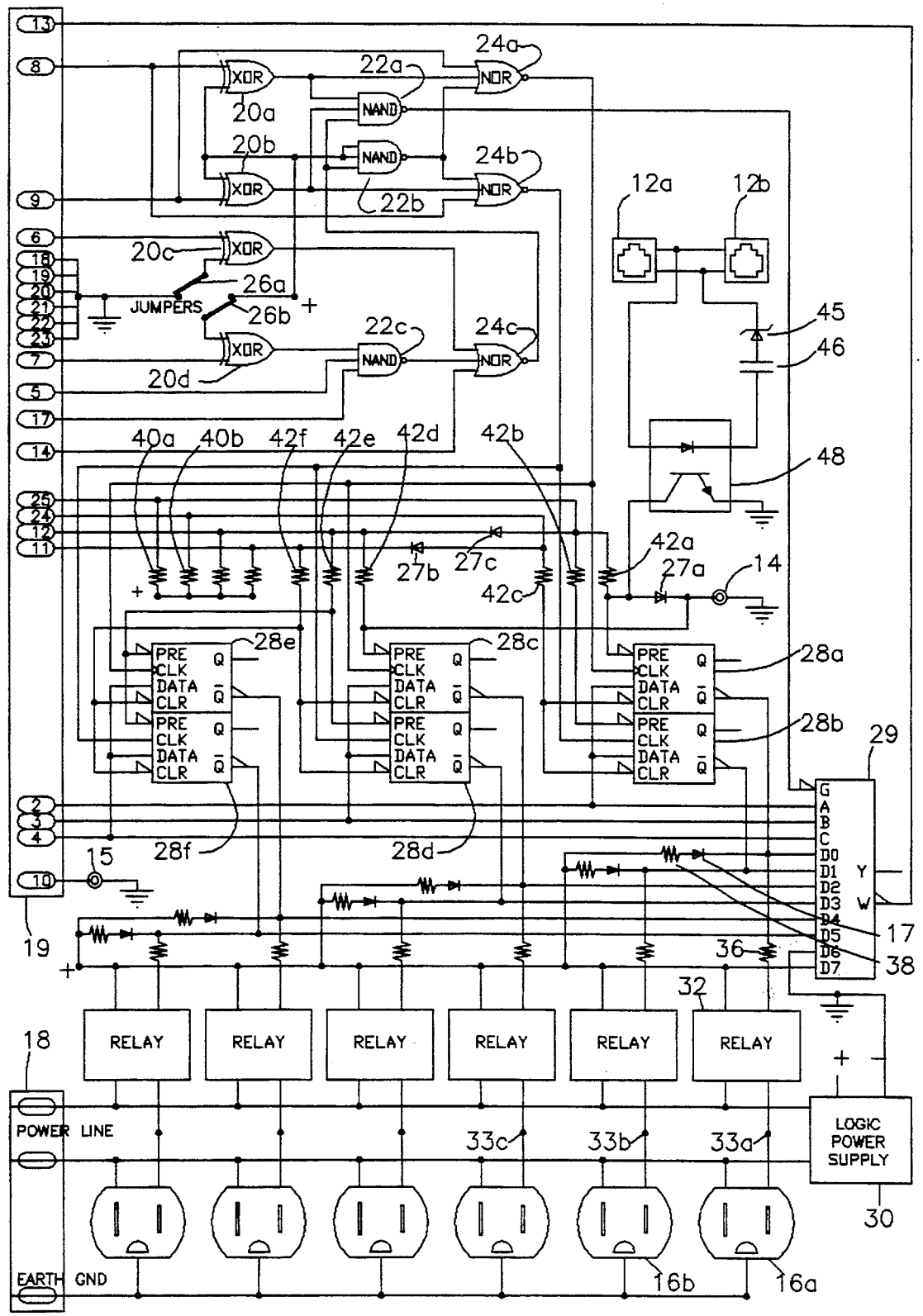
FIG. 4 is a schematic wiring logic diagram of a controlling logic circuit and power distribution arrangement.

Reference is now made to FIG. 4, which shows the logic and power circuitry that govern the power status of each of the outlets (e.g., 33a). Component 20a, 20b, 20c, 20d are a 74HCT86 quad two-input xor gates. Component 22a, 22b, 22c are a 74HCT10 triple three-input nand gates. Component 24a, 24b, 24c are a 74HCT27 triple three-input nor gates. Components 28a, 28b, 28c, 28d, 28e and 28f, are three 74HCT74 Dual D type flip-flop with preset and clear. Component 29 is a 74HCT251 three-state eight-bit multiplexer. Component 48 is a 4N25 optoisolator. Component 32 is one of the solid state relays made up of a MAC15-6 triac governed by a MOC3023 optoisolator triac in a circuit such as the ones described in page 6-92 of the Motorola Optoelectronics Device Data manual (DL 118 Rev 3). Pin layout for these components are obtained from any of many manuals available. Any 74XX series of logic components could be used, but 74HCT series of logic devices are used because of their lower power consumption, lower input signal current, and higher output current. Their low power consumption permits the use of a smaller power supply 30, The low input signal current allows direct connection of many of them to the port without burdening it. Higher output current means direct connection to the relays (e.g., 32) therefore fewer components.

Optoisolators are used to maintain the phone line and power line electrically isolated from the apparatus and more important, the computer.

Biasing resistors (e.g., 40a) are about five hundred ohms. Connecting resistors (e.g., 42a) are one megohm or more. This arrangement, besides carrying out it's main purpose described later, probably helps safeguard against electrostatic discharge (ESD) on the control cable.

These components are best mounted to a printed circuit board. Exceptions might be: the outlet connectors (e.g., 16a); the jacks 12a, 12b, 14, 15 and leds (e.g., 17) which protrude through the housing and therefore may be better attached to it.

Signals are exchanged with the parallel port by the logic circuit through the header 19 mating with the previously described socket connector 11 and therefore, except for user switches' contacts (eleven, twelve, twenty-three, twenty-four and twenty-five), we will refer to parallel port pin numbers directly. Pins ten and thirteen are used to send signals to the computer. Pins two through nine, fourteen and seventeen are used to receive signals from the computer. Pins eighteen through twenty-three are used for common ground (low) signals. The logic gates of the circuit detect and translate set and get command signals present in the port into signals acting on the flip-flops and multiplexer. A person with knowledge in the art will realize that with the jumpers 26a, 26b positioned as shown, a high logic level is present at the output of nor gate 24c only when pins five and seventeen are high and pins six, seven and fourteen are low. Under this particular combination of logic signals, subsequent results are: nand gate 22a will enable the multiplexer 29 only when pins eight and nine are low; nor gate 24a will actuate the CLK (clock) pin of flip-flops 28a, 28c, 28e only when pin eight is high and pin nine is low; nor gate 24b will actuate the CLK pin of flip-flops 28b, 28d, 28f only when pin eight is low and pin nine is high.

During a get operation the data is presented by the multiplexer 29, or status transmission means, to pin thirteen from the flip-flop selected by the address present on pins two, three and four. During a set operation these last three mentioned pins contain the data to be stored in three flip-flops through their DATA pin or data input means, when their CLK pin is activated with an enable signal.

D6 and D7 of the multiplexer 29 are biased low and high respectively to signal the presence of a valid apparatus when it's status is retrieved. This retrieving operation is used mainly for informing the controlling computer the power status of the outlets.

The flip-flops are storage means that maintain the status of the outlets or power output means. Each flip-flop controls one outlet through the Q- pin or data output means. Flip-flop 28a maintains the status of the first outlet 33a. Through a current limiting resistor 36 powers it on by sinking current from the relay 32, or power control means, controlling it. In such state it also sinks current from the light emitting diode 17 connected through it's current limiting resistor 38 causing it to light up.

The group of relays (e.g., 32) and outlet connectors (e.g., 16a) are connected to the power cable, or power input means, preferably by having the hot side of the electric line switched through the relays.

The power cable is also connected to the logic power supply 30 to provide +5 volts necessary for the proper operation of this apparatus.

A circuit that can provide a telephone ring signal is formed by the optoisolator 48, capacitor 46 and zenner diode 45. The zenner diode is of a value to only allow the higher voltage ring signal through. The capacitor is to keep the phone line's direct current from flowing and of a value just great enough to actuate the optoisolator.

The flip-flops also react to a low signal on their CLR (clear) or PRE (preset) pins. This flipping action is used to turn the controlled outlet on or off by means of a user switch or other device. The user switches' conductors are held high by bias resistors and their signal is carried to the flip-flops through connecting resistors and sometimes a diode. When conductor twenty-four, that is held high by it's biasing resistor 40b, is turned low by means of a low signal returned by pressing of user switch 8b, or by diode 27b by pressing user switch 8d, then said low signal is carried by connecting resistor 42c to the CLR pins of the first two flip-flops 28a, 28b and the output pins connecting them to their relays go high deactivating these relays and this turns the first two outlets 33a, 33b off.

In a similar manner operates conductor twenty-five, the difference being that the low signal on this conductor is applied by user switch 8a, or user switch 8c through conductor twelve and diode 27c, and that this low signal is carried by two separate connecting resistors 42a, 42b and applied to the PRE pins of the flip-flops 28a, 28b resulting in the first two outlets 33a, 33b turning on.

Only the first outlet 33a is turned on when a low signal is applied on the PRE pin of flip-flop 28a by the optoisolator 48 activated by a telephone ring signal. This is due to the effect of biasing resistor 40a which, because it is many times lower in value, sources more current than the connecting resistor 42a sinks. And because a diode 27a keeps this low signal from traveling towards the independent device connector 14 and the third flip-flop 28c.

The first and the third outlets 33a, 33c are turned on when a device connected to the independent device connector 14 applies a low signal because a diode 27a also carries the low signal to the PRE pin of the first flip-flop 28a. The low signal is confined to only these two flip-flop's PRE pins by virtue of the biasing resistors sourcing more current than the connecting resistors can sink, as explained before.

All the outlets are turned on when a low signal is simultaneously applied to the PRE pins of all the flip-flops. This is done by user switch 8c through conductor twelve and the following: the connecting resistors 42d to flip-flop 28c; the connecting resistor 42e to flip-flops 28d, 28e, 28f; diode 27c with the connecting resistors 42a, 42b to flip-flops 28a, 28b.

Similarly, all the outlets are simultaneously turned off when a low signal is applied to the CLR pins of all the flip-flops. This is done by user switch 8d through conductor eleven and the following: the connecting resistor 42f to flip-flops 28c, 28d, 28e, 28f; diode 27b with the connecting resistor 42c to flip-flops 28a, 28b.

The hardware interrupt connector 15 provides the means for that signal to reach the control cable on it's way to the computer's port.

The method for controlling through the parallel port includes presenting the special sequence of pin values in a manner that does not interfere with the normal operation of a printer or device attached to the same port. In most cases a printer is immediately controlled through pins one and sixteen. By not disturbing the signals on these pins in the connection and operation of the apparatus, coexistence with a printer in a functionally transparent manner is possible. Furthermore, by having a particular configuration of involved pins values to operate the apparatus, the chances of them being presented by the operation of the other connected device is minimal. Pin values are used like a combination to a combination lock.

The electronic circuit design and construction of parallel port pins are according to their function. To similar function, similar circuit implementation. Upon power application and removal the parallel port pins will assume unpredictable voltage values but, those of similar construction, will simultaneously transit similar voltage values. Pins one, fourteen and seventeen are one example of such pins. After boot up or initialization, the value for these pins are high for pins one and fourteen and low for pin seventeen. The apparatus takes advantage of this by including in the controlling combination, or enable signal, that pin fourteen be low and pin five and seventeen be high. With this particular combination present, attention is on pins six and seven, they determine which group of outlets, of the four that may be connected to the same port, are to operate. Pins eight and nine determine the operation to be performed by the selected group. These are: to set the status in even numbered outlets, to set the status in odd numbered outlets, or to get the status of the selected outlet.

Pins two, three and four present the data to be set, or the address of the outlet to get. The get operation is performed by successively obtaining in pin thirteen the status of each flip-flop controlling an outlet. It is an operation performed six times, one per outlet. The set operation is performed on three outlet controlling flip-flops at a time. It takes two operations for all six outlets. On one operation the first, third and fifth flip-flops are set. On another operation the second, fourth and sixth flip-flops are set. All these operations are carried out by the computer in use of the pertinent process.

Figure 7A:
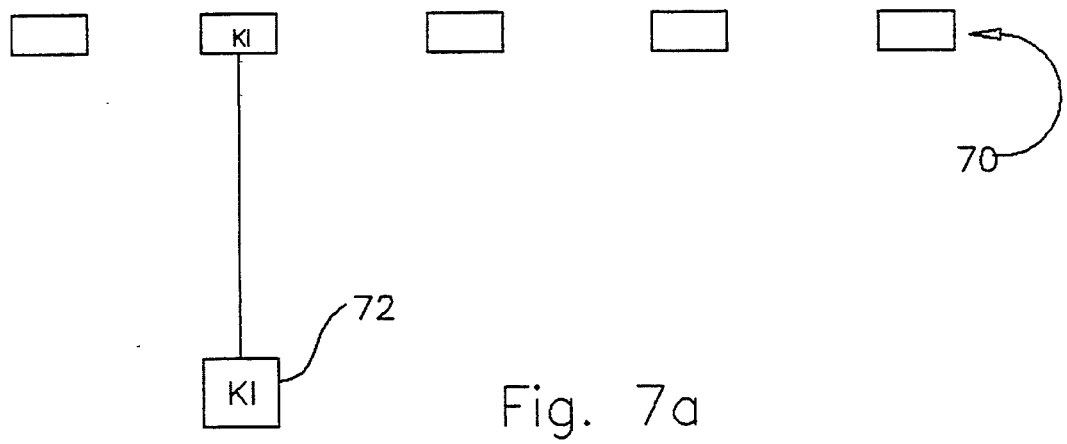
FIG. 7a through 7i are schematics of program flow starting at the keyboard interrupt address vector in a computer's Interrupt Table.

The method also includes suitably programming the computer to translate a request into the proper sequence of values of the parallel port pins to switch the outlets to the requested status. The computer processes to handle these requests are various commands and memory resident routines, other related commands are used for conditioning the routines. The routine's addresses are installed in the Interrupt Table and are invoked through those interrupts, this is a common procedure for most computers. FIG. 7a shows a diagram of a portion of the Interrupt Table 70 and of the Keyboard Interrupt Handler Routine 72 that is normally part of the computer's ROM BIOS.

One routine is the Keyboard Monitoring (KM) Routine that is installed to monitor keyboard scan code activity. It is placed logically ahead of all other routines handling a Keyboard Interrupt and takes control when the proper keyboard key combination is present, otherwise it passes through all keyboard information.

Once activated, it calls on the Keyboard Switch Control (KSC) Routine that acknowledges with a particular sound and executes the process that allows changes in the outlets status using the keyboard.

Figure 5:
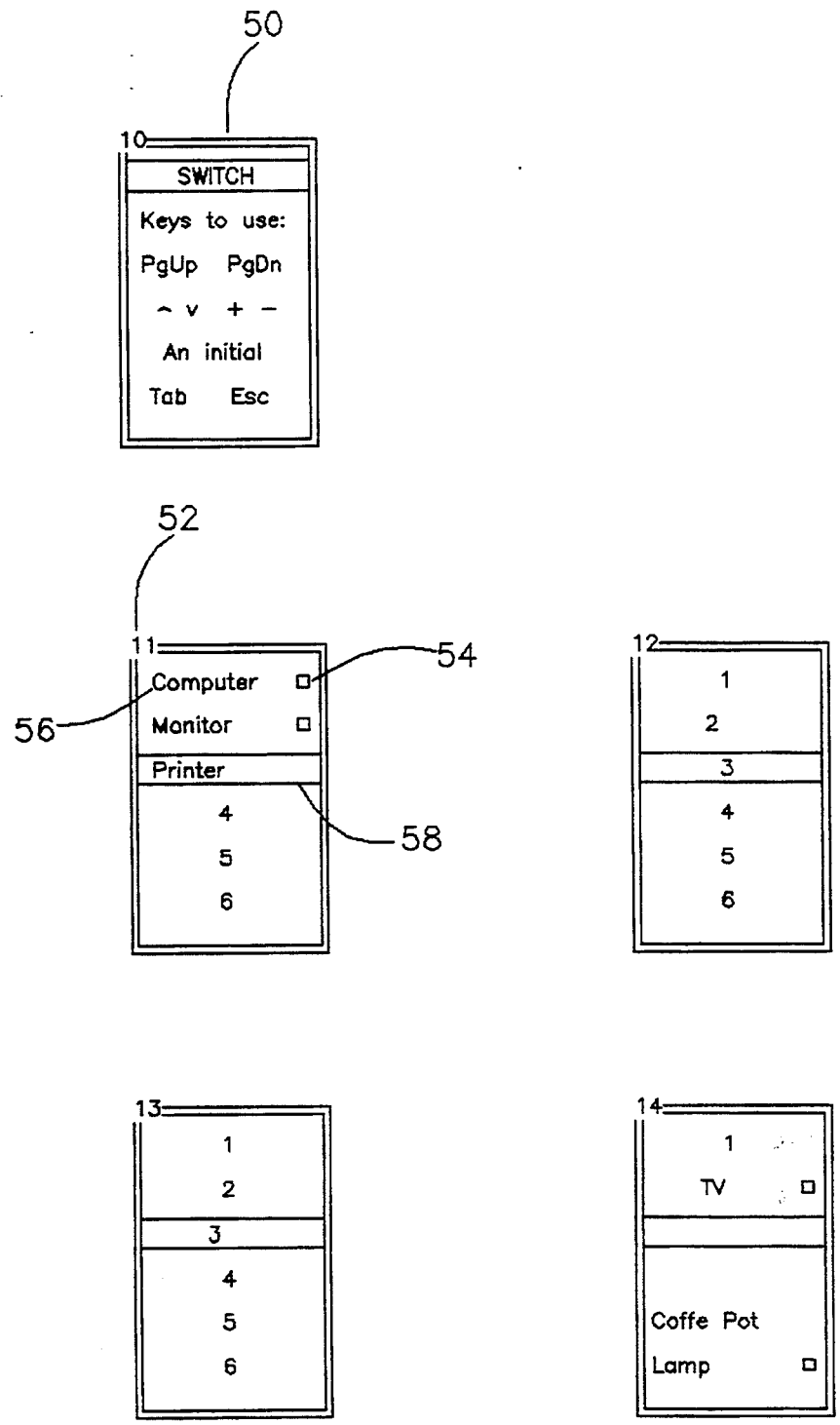
FIG. 5 is an illustration of five pages of a pop-up window display.

Now making reference to FIG. 5, that illustrates the various pages that the KSC Routine can display. This process normally entails saving a portion of the active screen and replacing it with a window 50 presenting an initial page with brief instructions. This window can have different pages accessible with the Cursor Up, or Cursor Down, or Page Up, or Page Down, keys. One page is established automatically for each group of outlets present and it is identified 52 accordingly with the Port Group numbers combination.

In each one of those pages an identifying label 56 for each outlet is present along with an icon 54 that denotes the status of the outlet. The chosen 58 outlet is displayed in a distinctive manner and selection of it can be done by use of the Cursor Up and Cursor Down keys.

Once selected the status of it may be changed by use of the Plus key to turn it on, Minus key to turn it off, or Tab key to flip it, and any one of these actions will be acknowledged with a particular sound. Simultaneous selection and flip is achieved by pressing the key of the desired outlet's label initial.

Once completed the window is exited by use of the Esc key, which also acknowledges with a particular sound. Upon exit the window is replaced with the stored initial screen contents and label position is saved till next activation thereby presenting the window as it was when exited. Control is returned to the KM Routine, which in turn goes into it's initial state of keypress scan code monitoring. Subject to conditions set with a command, the sound and window are inhibited, one or both.

In order to ensure priority of the KM Routine in handling an interrupt call, a Periodic Verification (PV) Routine is installed. It is placed with any other routines established for the timer interrupt. It is made to go active about once every second. In each occasion it makes sure that the KM Routine's address vector has not been displaced from the Interrupt Table and, if so, it restates it without any sacrifice of the offending program.

Figure 7B:
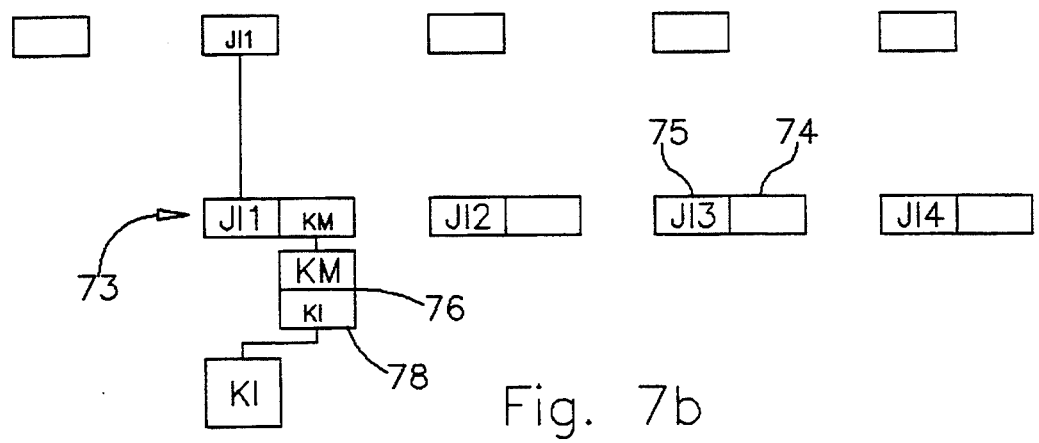

Now making reference to FIG. 7b. This is done by use of a Vector Redirection Table (VRT) 73 that comprises consecutive memory spaces 74 each preceded with a jump instruction (JI) 75 and of size to contain an address. These cells in the VRT are miniature routines, the only thing they do is to redirect program flow to the address stored in their memory space 74. On the first available memory space of the VRT the KM Routine's 76 address is placed, the KI Routine's address found in the Interrupt Table is placed in the KM Routine's Exit Address (KMEA) 78 and the corresponding JI's address is placed in the Interrupt Table.

Figure 7C:
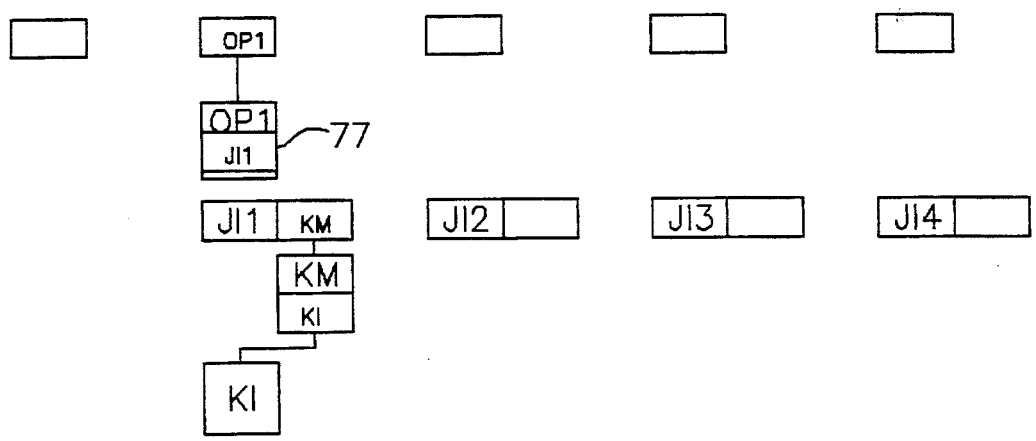

Now making reference to FIG. 7c. An offending program will normally store 77 the address it finds in the Interrupt Table before displacing it with its own address. It saves it so that it can restore it when finished.

Figure 7D:
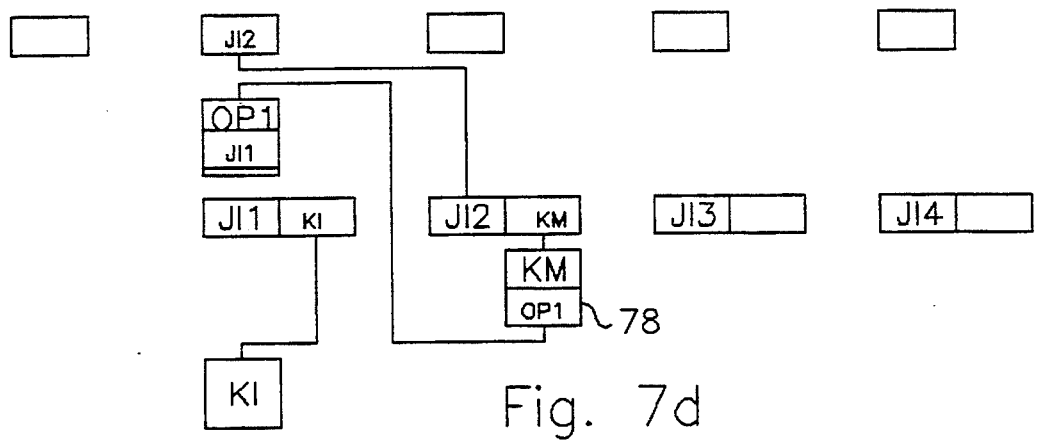
Figure 7E:
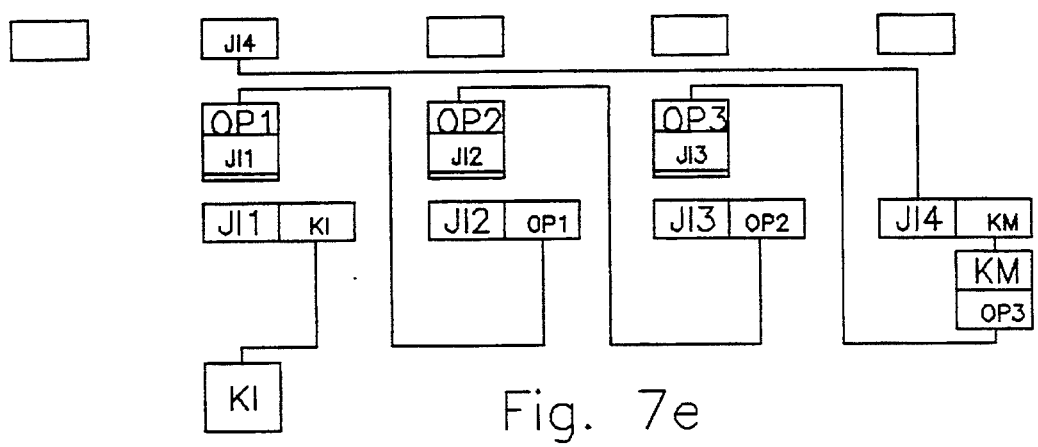

Now making reference to FIG. 7d. Upon detection of this displacement the PV Routine places: the contents of the KMEA 78 where the KM Routine's address was in the VRT, the new found address from the Interrupt Table in the KMEA, the KM Routine's address in the next available memory space in the VRT and this new memory space's JI address in the Interrupt Table. Thus a logic line has been formed with the KM being first in line. From the Interrupt Table, control is transferred to the second JI, to the KM Routine, through the KM Routine to the KMEA, to the offending program where responsibility is assumed. This process can be repeated as many times as memory spaces are available in the VRT and the result is visualized in FIG. 7e.

Figure 7F:
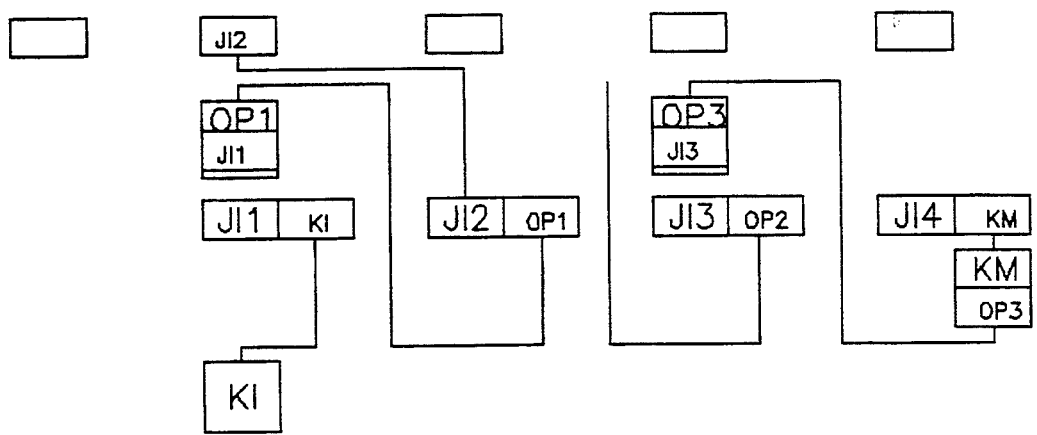

When an offending program terminates, as depicted in FIG. 7f, it will replace in the Interrupt Table the address it initially saved from it, none other than a JI address. On such an occasion the PV Routine will know that it is a terminating program and not a new one because the address now found in the Interrupt Table will be one of the JI addresses, and not the KM Routine's JI address. The location pointed by it identifies the memory space being released.

Figure 7G:
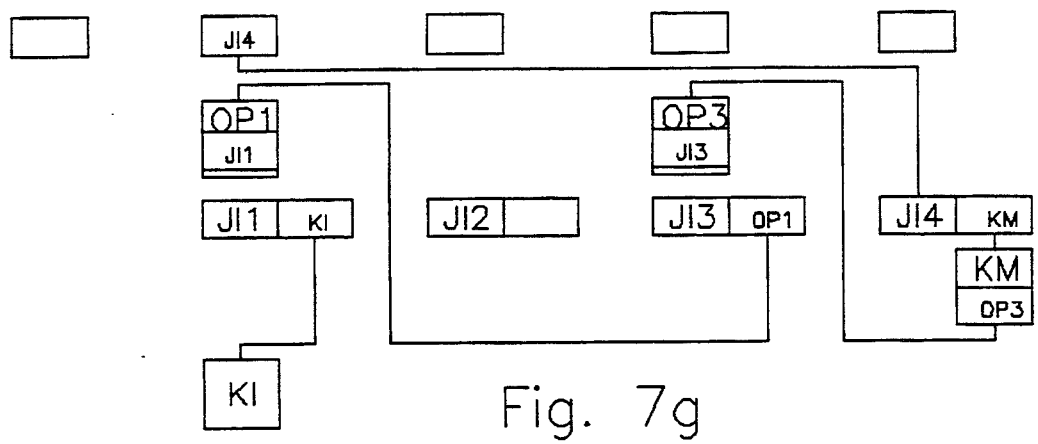

Now making reference to FIG. 7g. On this occasion the PV Routine moves: the address in the memory space being released to the next forward memory space and replaces it's JI address in the Interrupt Table. This is analogous to relinking a broken chain.

Figure 7H:
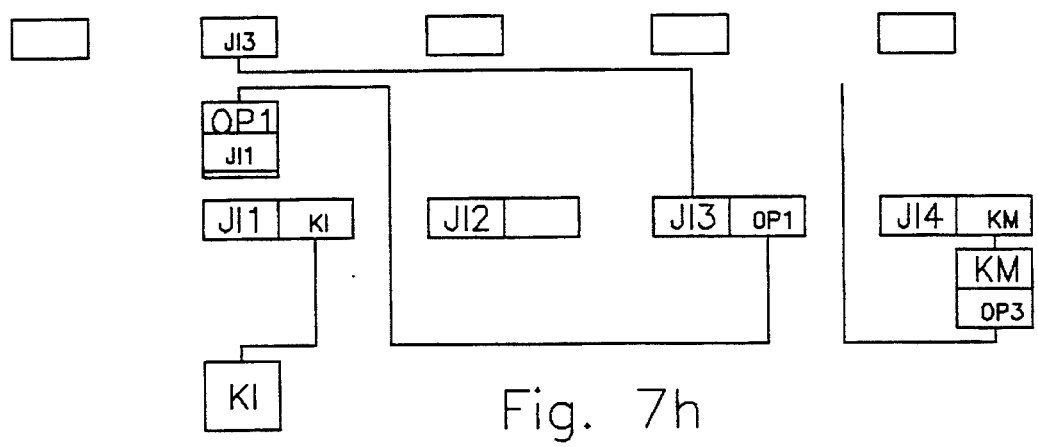
Figure 7I:
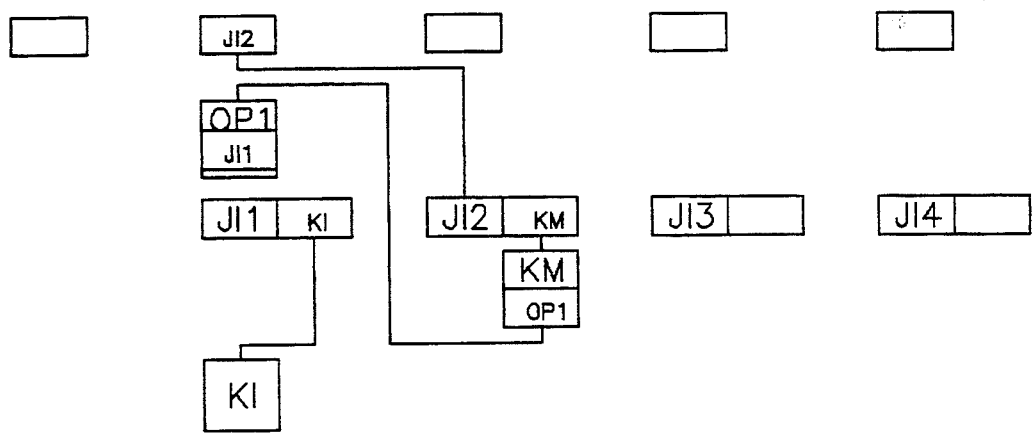

When another program terminates, the resulting break is depicted in FIG. 7h. At this point the PV Routine carries out the same relinking process as before and is able to complete another step: it shifts the contents of the last memory space back to previous memory spaces to release as many memory spaces as possible for future use. The result is depicted in FIG. 7i, which is the same as FIG. 7d.

With a command the KM Routine's address vector management is enabled or disabled.

The PV Routine also checks the printer automatic power status, if it is on it periodically decrements a register by one and when it reaches zero it executes a process to turn off any flow of electric power to the outlet for the printer.

Another routine, the Printer Control (PC), is a printer interrupt handler and, because in this case printer activity is controlled through the parallel port, it submits the status of an outlet to the activity of the parallel port. When a program requests a character to be output to the printer, it first tests the printer status with the BIOS Printer Routine. If no error is detected it continues with the normal BIOS Printer Routine to print the requested character. If an error is detected, it proceeds to turn the printer outlet on (turn on flow of electric power) and wait some time until the printer responds. Upon response it outputs with the BIOS Routine a user predefined string of control characters, if they exist, and waits again for printer response before proceeding with the BIOS Routine to output the requested character. If after waiting some time the printer has not responded then it continues with the BIOS Routine anyway. With every character output a countdown register is restarted to let the PV Routine handle it. The user predefined character string is normally used to perform software configuration of the printer.

Two other routines are part of the IRQ Interrupt Handler. The address of the first one is installed in the Interrupt Table to allow it to receive control when a hardware interrupt originates in the parallel port, interrupt 0FH. This initially designated interrupt number is changed with the IRQ Command. When this first routine is activated, it enables (authorizes) a second periodic routine. It also sets up a window in the same manner as the KSC Routine and monitors activity of the keyboard port awaiting the presence of the End key. When the End key is pressed, it vanishes the window and relinquishes control. While waiting for this keystroke it constantly shows a page in a cycle of appropriate messages and instructions. Which page is shown at a particular moment is determined by the second periodic routine.

The second periodic routine is installed serially with other routines handling a Timer Interrupt and, once authorized, made to go active every second. At such occurrences it makes sound, decrements a register in a cycle that determines which is the visible page and it decrements another register in a countdown that once it reaches zero will enable another countdown responsible for powering off all the outlets one at a time. This second periodic routine is also authorized or deauthorized with the appropriate IRQ Command. Or, when authorized with a command, can also be deauthorized with an interrupt call to the first routine, with registers AX=7777H and CX=5555H.

The address of the INT Routine is installed in the Interrupt Table to allow an application program to have control of the outlets by calling interrupt 60H. This initially designated interrupt number is changed with the INT Command.

When called it uses the value in register AH to determine the function to perform with the value in register AL. Like all the other routines acting on an outlet, it determines that the port number requested is valid, that this valid requested port number exists, that the requested outlet number is valid and that this valid requested number exists in one of the connected groups at the port. Any failure in these tests is flagged with a particular bit in a byte of information that is relayed back as the error message in a failed function execution. If no error was encountered then the requested function is executed and the outlets' status is the returned byte of information where the first outlet is represented by bit zero and so on.

The INT Command is also used to enable or disable a characteristic sound, made when a function is executed.

OPERATION

Again making reference to FIG. 1, the male D-Subminiature port connector 1 is connected to a parallel port in a computer (e.g., IBM PC, IBM Corp. With: 128K of memory, one diskette drive, DOS Version 3.1, keyboard, monitor with a standard power chord, parallel port) and a printer (e.g., LQ 850, Epson America, Inc.) normally connected directly to this port is connected to the female D-Subminiature connector 2. This way the printer maintains it's connection to the parallel port by means of cable section 3 and said male connector 1. With this attachment, signals occurring at the parallel port are also transmitted through the main portion of the control cable 10 to the apparatus along with signals communicating with the user switches 8a, 8b, 8c, 8d. And signals present in the apparatus are transmitted to the parallel port.

The user switches section of cable 6 is stretched out towards the desired location for the user switches 8a, 8b, 8c, 8d. These can be fixed by some supportive or adhesive means to the operator's most convenient location.

The group of outlets is placed preferably on the floor, close to the wall behind the computer. The computer is plugged to the first outlet connector 16a, it's monitor to the second 16b, the printer to the third, etc. All the power switches of the connected devices are left in the on position. The power cable 18 of the apparatus is plugged to an appropriate electrical power source such as a 120 VAC wall outlet connector.

If the printer is remotely located then the apparatus can be placed next to it in that location or a second apparatus can be used. They are both controlled with the same printer line.

If phone activation is desired the phone line is routed through the phone connectors 12a, 12b. Again, as is the case of the D-Subminiature connectors in relation to the parallel port, this will not sacrifice other use of the phone line.

The computer or all the devices can now be turned on or off by use of the user switches. Power is initially applied to the first two outlets (computer and monitor) by use of switch 8a. Once booted-up the computer is suitably programmed with memory resident routines from a diskette contained in the drive that also allows execution of other pertinent programs as external commands. The routines can also be installed and configured initially with appropriate commands within the batch file executed at boot-up.

Immediate management of the flow of electric power is now performed by using any of the user switches that are conveniently located, or by using a predesignated keyboard. combination to have the computer respond momentarily to keyboard operated power switching commands, or by executing a computer command, or by an external signal such as that of a telephone ring signal.

Programmed management is done by including the appropriate ON Command in the batch file that executes the application program needing a particular peripheral on, and executing the appropriate OFF Command from within said batch file when the application program is exited; or by suitably programming the computer to power automatically a peripheral when no response is attained from it because of lack of flow of electric power; or by having an application program switch the flow of electric power to a peripheral as it needs to through the INT Routine.

Another form of programmed management is done by having in memory a program to respond to an unpredictable event. This is performed through a hardware interrupt and it's associated IRQ Interrupt Handler.

Because there are different approaches to the same goal, in a system there should be more than one path to accommodate the same intent. It is through this redundancy of ways that ease of use is further achieved. The more ways available, the more chances one of them is the user's intuitive way. For example: to use a word processor a user can have the batch file that brings up the program first turn on the outlet to the printer; or the user can turn the outlet on with a command before starting the program; or the user can push the switch that turns that outlet on; or more conveniently at any time with the keyboard or means for data entry, while using the program, a pop-up window can be activated to let the user turn on or off that outlet; or better yet, the user can forget about it. It will be automatically turned on and the printer configured as soon as the first character needs to be printed. Sometime after using the printer, it will be automatically turned off.

These methods have provisions to allow the outlets of up to four groups (each group being an apparatus) to be connected to the same parallel port and be individually operated. When connecting more than one apparatus to a single port, a change in the positions of the jumpers 26a, 26b must be performed so that no two apparatus have the jumpers configured alike. Alike configuration of the jumpers would cause twin response to every computer command. A computer normally can accommodate three parallel ports and every port can control four apparatus each containing a group of six outlets. In many of the various commands, reference is made to a particular outlet by specifying port number, group number and outlet number in sequence. When referring to an outlet in the first port and group, only the outlet number is necessary. Port and group number default to number one. For example to turn on the third outlet of the first group connected to port number one, you can use the command:

|  | ON 3 |
|---|---|
| or also | ON 13 |
| or also | ON 113 |

They are all equivalent. The command:
OFF 243
will turn off an existing third outlet in the fourth group connected to parallel port number two.

The ON, OFF and FLIP commands are used to turn any controlled outlet to the on, off, or reverse status respectively. They are used from the command line or invoked from within a batch file to switch immediately an outlet. With every executed switching command a particular sound is made according to the operation being performed. Provisions have been made to suppress these sounds. This is accomplished by using a prefix and an option with the command, like this:
ON 243/S
the prefix in this example is the forward slash and the option is the letter s, upper or lower case.

The STATUS Command is used like the ON, OFF and FLIP commands. The response is the appropriate message of the inquired outlet's status accompanied by that status' sound. Also, as with the ON, OFF and FLIP commands, the status of all outlets in that group, or an error code when applicable, is passed in the return code to DOS (Disk Operating System) and is available to a parent program, or in the ERRORLEVEL variable, to a batch file. If the status of only the inquired outlet is to be contained in the return code then the/prefix and the A option must be included with the STATUS Command. For example:
STATUS 243/A
will have a return code of zero if the outlet is off or a one if on. Any other value means an error return code. Programs can use this information to make logical decisions.

The return code is a byte composed of eight bits. When bits six and seven are clear (turned off) then bits zero through five reflect the position of outlet's one through six. Otherwise those bits when set (turned on) reflect the reason for failure as follows:
Bit seven=off
Bit six=on, this is an error code
Bit five=Invalid Outlet Number
Bit four=Nonexistent Group Number
Bit three=Invalid Group Number
Bit two=Nonexistent Parallel Port
Bit one=Invalid Parallel Port Number
Bit zero=No options present on command line Other available commands affect the way their related memory resident routines will function. The SWITCH, INT and IRQ commands are followed by a number that identifies the parallel port to which their related routines are assigned. For example:
SWITCH 1
tells the command that any following options are to affect the routines installed for parallel port number one. The command will search in memory for that particular routine, if it is not found it will establish it, and set it to act in accordance with any requested options for the remainder of the session, provided they are valid.

The SWITCH Command has many options to accommodate many conditions and preferences. The options chosen affect the way the keyboard switch control (KSC), keyboard monitoring (KM), periodic verification (PV) and printer control (PC) memory resident routines are done. The KM Routine is established to alert the KSC Routine of a user's request for immediate keyboard control of the outlets. The user request is done by simultaneously pressing the predesignated keyboard keys. This key combination is designated by including at the end of the SWITCH Command the/-prefix followed by a shift key option and the desired key's hexadecimal keyboard scan code. For example:
SWITCH 1/A1E
will designate the KSC Routine's activating key combination to be the Alternate Key followed simultaneously with the z Key. Shift key options are: A for the Alternate Key, C for the Control Key, L for the Left Shift Key, R for the Right Shift Key, or N for no shift key at all. The keyboard scan codes are obtained from the computer's user manual. Once the KSC Routine is invoked it normally displays a pop-up window and produces a sound to alert the user of it's presence. The window may not pop-up if the routine finds that it cannot restore the active screen properly when exiting. This feature can be overridden and a pop-up window made to appear every time by including at the end of the SWITCH Command the prefix/and the option T. For example:
SWITCH 1/T
or it can be always suppressed with the prefix/and the option I. For example:
SWITCH 1/I
or can be changed back to it's initial condition of allowing a pop-up window only in permissible screen modes with the prefix/and the option W. For example:
SWITCH 1/W Now making reference again to FIG. 5. The pop-up window presents different pages of information that can be accessed with the Page Up or the Cursor Up keys to go backwards to the previous page, the Page Down or the Cursor Down keys to go forwards to the next page. The first page contains information about the use of the meaningful keys. The next pages appear subject to the physical presence of any controlled apparatus. There is one page for every apparatus connected to the controlling parallel port. Each one of these pages contains in it's upper left corner 52 the parallel port and group (apparatus) number that it is linked to and in the main portion six lines each 56 one comprising a string of ten alphanumeric characters that help identify or give meaning to each outlet in the group. At the end of each line an icon 54 in the form of a square is present when the outlet is on or absent when off. These lines can be user defined with any alphanumeric character string. To do so each string is entered consecutively in an ascending order with a comma as the prefix for each line. Only a space following a comma will erase the related line, nothing following a comma will keep the related line. With this technique all twenty four possible lines can be entered through successive use of the command. For example:

SWITCH 1,Computer, Monitor, Printer followed with

SWITCH 1 ,,, TV ,,, Coffee Pot, Lamp will change the first three lines on the first group and the last five lines on the fourth group.

One of those window lines, the chosen 58 one, is highlighted to mean that it will be switched on, off or flipped in use of the Plus, Minus, or Tab keys respectively. A different line can be chosen by selecting it with the Cursor Up or Cursor Down keys or it can be chosen and it's outlet status flipped simultaneously by pressing on the keyboard the key representing the initial letter (alphanumeric character) of the line to be chosen.

With every switching action and on activation and deactivation of the KSC Routine a particular identifying sound is made. This sound can be silenced by including at the end of the SWITCH Command the prefix-/and the option S. For example:

SWITCH 2/S or it can be set to it's initial condition with the prefix-/and the option B. For example:

SWITCH 2/B

To exit the KSC Routine the Escape Key is pressed. Upon exiting a sound is made and, if the window is active, the screen is restored. The chosen 58 line is remembered for next time and keyboard control is returned to previous use. The chosen line can be changed by including at the end of the SWITCH Command the prefix/F followed with the group (page) and outlet (line) number. For example:

SWITCH 1/F24 will make the fourth outlet in the second group connected to the first parallel port the chosen one. This customizing is useful in situations where the window is not made to pop-up and certainty of chosen line is desired when running an application program, also to speed access to the outlet's page by avoiding the instructions page on start-up.

Many application programs have no need for keyboard customizing but many others do. The ones that do, normally replace any routine installed for keyboard activity with their own. In these cases the KM Routine is logically displaced and has no keyboard control needed to trigger and pass information on to the KSC Routine. To keep the KM and KSC Routines from being disabled, the PV Routine is installed in memory. This routine is installed in series with any timer routines and made to go active about every second. With each occurrence it checks that the KM Routine is installed properly, if it finds any disrupting routine it places the KM Routine again first in line and the offending routine following it. This way the KM Routine is the first to receive keyboard control and as long as the predesignated keys are not pressed it relinquishes control to the next in line. The PV Routine automatically determines if the disruption is because of a routine being either installed or removed and acts accordingly. There are other application programs that will not accept displacement but sharingly pass on keyboard control, in which case the PV Routine's action is unnecessary. To accommodate these two situations there are options to change back and forth. To disable the PV Routine's KM Routine management the prefix included at the end of the SWITCH Command is/and the option is U. For example:

SWITCH 1/U to re-enable the PV Routine's KM Routine management the prefix is/and the option is M. For example:

SWITCH 1/M

With these two options probably all programs can be accommodated. If more than one port is being used, then only one of them can have this management enabled. The proper option is normally established from within a batch file before entering the application program.

Another purpose of the PV Routine is to turn off the printer outlet when it has been turned on automatically and a previously established countdown reaches zero. This countdown is started at a predesignated value every time a character is output to the printer. This value is expressed in seconds and is determined by including at the end of the SWITCH Command the prefix/0 followed by a decimal number value. For example:

SWITCH 1/060 will have the PV Routine wait about sixty seconds before turning the printer off. Using only the prefix will disable the automatic printer outlet power feature. For example:

SWITCH 1/0

To change the printer outlet that will automatically be powered up when using the printer the prefix/E followed by the desired group and outlet number. For example:

SWITCH 1/E24 will change it to outlet four of the second group from the default group one, outlet three. Upon power up a printer might need to be configured before use and in some printers this configuration is done by outputting to it a control character string. For situations such as these a character string is established by including at the end of the SWITCH Command the prefix/D followed by the character string. For example:

SWITCH 1/DCharacter string

This character string must occupy the last position in a group of options used with the command, otherwise the other options will be taken as part of the character string. Also, since a character string of this nature usually contains nonvisible control characters, the command and character string are best placed within a batch file that is arranged with an appropriate text editor (e.g., XYWrite of XYQuest Inc. ). The batch file used is normally the one that executes an application program.

All or some of these options can be entered successively on the same line and these commands can be used any number of times throughout the session.

The INT Command establishes options for the INT Routine that is placed in memory to give an application program control of the connected outlets. Like the other commands, the INT Command can silence or activate the sound feature of the INT Routine with the prefix/and the appropriate option issued with the command. It also can establish another interrupt number, besides the one it was installed for, to which the INT Routine responds, this is done by including the prefix/N followed by the desired hexadecimal value. For example:

INT 1/N6F

The INT Routine is used by an application program in the following manner: register AX is set to contain the desired function in AH and the outlet identity in AL before issuing the appropriate interrupt call. The identity of an outlet will be a number between one and twenty-four.

Depending on the value of AH a function is performed as follows:

AH=0 turns off the outlet identified in AL.
AH=1 turns on the outlet identified in AL.
AH=2 flips the status of the outlet identified in AL.
AH=3 returns in AL the status of the outlet identified in AL.
A value of zero if the outlet was found to be off.
AH=4 simultaneously sets all outlets in the first group according to the value in AL.
AH=5 simultaneously sets all outlets in the second group according to the value in AL.
AH=6 simultaneously sets all outlets in the third group according to the value in AL.
AH=7 simultaneously sets all outlets in the fourth group according to the value in AL.
AH=80H through 87H carry out the previous functions but using the parallel port designated in register DX. Normally the parallel port used is the one designated when installed. Upon completion of the INT Routine AH contains the status for the outlets in that group or an error code as the return code described before. AL may contain a value of zero.
All other registers are undisturbed.

The IRQ Command establishes operating conditions and options for the IRQ Interrupt Handler that is placed in memory to display a warning window and to turn off all outlets after waiting a predetermined amount of time while maintaining a repeating sound. It will do all this when activated by an interrupt call, either from hardware or software. It only will wait while making sound and then turn off all outlets when authorized to do so with a command.

The IRQ Interrupt Handler normally lies dormant until a triggering device, such as a powering UPS informing of a power failure, sends a hardware interrupt signal that is transmitted through pin ten on the parallel port, authorizing it. At such instant it displays a window with continuously repeating messages and sound informing the operator of the event and requesting to turn off all the equipment within a specified length of time. The operator can vanish the window and regain control by pushing the End key, the IRQ Interrupt Handler continues being active and warns so by maintaining the repeating sound. The operator may finish any application program being performed and proceed to deauthorize it by resetting it with the IRQ Command. For example:

IRQ 1

Upon reset the sound also will cease. In the event that it is not deauthorized, at the end of the specified length of time it will proceed to vanish the window if still displayed and, starting with the last one, turn off one outlet every second. This interrupt handler also allows some customizing. Any message can be the displayed one and therefore reminders and instructions will be ready for such occasions. Lines in the window are changed in the same way as is done with the SWITCH Command. The differences are that each line is eleven characters long instead of ten and there are five changeable pages for the window instead of four. It is normally installed to respond to Interrupt 0FH that is the one IRQ7 addresses when responding to the signal on pin ten of the parallel port. The IRQ Command also can establish a different interrupt number to which the IRQ Interrupt Handler responds, this is done by including the prefix/N followed by the desired hexadecimal value. For example:

IRQ 1/ND will have it respond to Interrupt 0DH that is the one addressed by IRQ5. The number of seconds delayed before power-off is set by use of the prefix/0 followed by a decimal number value. For example:

IRQ 1/05 will cause the IRQ Interrupt Handler to wait about five seconds after being authorized until power in the outlets is started to be turned off. And, again as with the SWITCH Command, the sound and window can be enabled or disabled by using the appropriate prefix and option with the IRQ Command. To authorize only the IRQ Interrupt Handler, the IRQ Command is followed with the prefix/and the option A. For example:

IRQ 1/A

A typical initialization (e.g., AUTOEXEC.BAT) file that contains recorded conditional instructions for boot up in a computer could contain, besides any other established ones, the following commands:

| SWITCH 1/W | (at the beginning) |
| ... | (any other instructions) |
| ... | |
| STATUS 2/A | (is the second outlet on?) |
| IF ERRORLEVEL 1 | GOTO END |
| IRQ 1/A | |
| ON 4 | (turn on modem on outlet four) |
| | (communications program) |
| IRQ 1/A/0 | (start turning everything off) |
| :END | |

In this example the logical test (Errorlevel) will determine if the computer was powered up using a user switch or using a telephone ring signal, in which case the second outlet 33b will be off. If the telephone ring signal activated it then the fourth outlet is turned on to power a modem connected there and the IRQ Interrupt Handler is authorized in case the incoming call is a wrong number. If it is a valid phone call, by means of the communications program deauthorization would be performed over the phone line and, at the end of the session, the IRQ Interrupt Handler would turn off everything. The last IRQ Command can be replaced with multiple OFF Commands if quicker turn off is desired.

In the particular case where the IRQ Interrupt Handler is authorized with the A option, it also can be deauthorized by setting AX=7777H, CX=5555H and issuing from within an application program the interrupt call that it was installed for.

Another way of powering the computer or equipment and starting a process is with the use of a timer. It is set for the time at which the process is to start, for example a few minutes before arriving to the office. Once the computer is started the initialization file will turn on the outlets of equipment that needs some time to warm up, for example a coffee pot or a photocopier. In addition it can have a ready to use lengthy startup application program, for example a large CAD file. The initialization file can do all this and then turn the computer off, leaving the other outlets on. For that occasion when the user can't get to the office, a telephone call can turn off everything.

At the end of a working day, a batch file to backup all important information and turn off the computer and a backup device connected to the fifth outlet might look like this:

| | |
|---|---|
| OFF 2 | (turn monitor off) |
| BACKUP C: E: | (send information to device) |
| IF ERRORLEVEL 1 | GOTO ERROR |
| OFF 5 | (turn off backup device) |
| OFF 1 | (turn computer off) |
| GOTO :END | |
| :ERROR | |
| ON 2 | (turn monitor on) |
| ... | (error condition instructions) |
| :END | |

This can relieve the user from having to wait some minutes everyday for the backup process to end before turning off the computer. If an error in the backup process arises then instructions are executed to alert the user of the event. This can be simply leaving the equipment on; or running a file that continuously flashes the lamp in the room to attract attention; or turning on a modem and calling the user.

Briefly mentioned here but with much potential is the use of this invention for controlling machinery in a workshop. For example: the first outlet controls a solenoid that clamps the welding tips of a spot welder, the second outlet activates the welding current, a third and a fourth control a second spot welder, the fifth outlet controls another solenoid that moves both spot welders back and forth in relation to each other, thus a sequence can be controlled where one spot welder clamps and welds when they approach and the other spot welder clamps and welds while the two retract creating a "sewing" action, click a foot switch and an IRQ signal informs the application program to alter the sequence to reverse sewing direction, double click it and everything stops. With personal computer CAD/CAM ever increasing, the future looks bright.

Figure 6A:
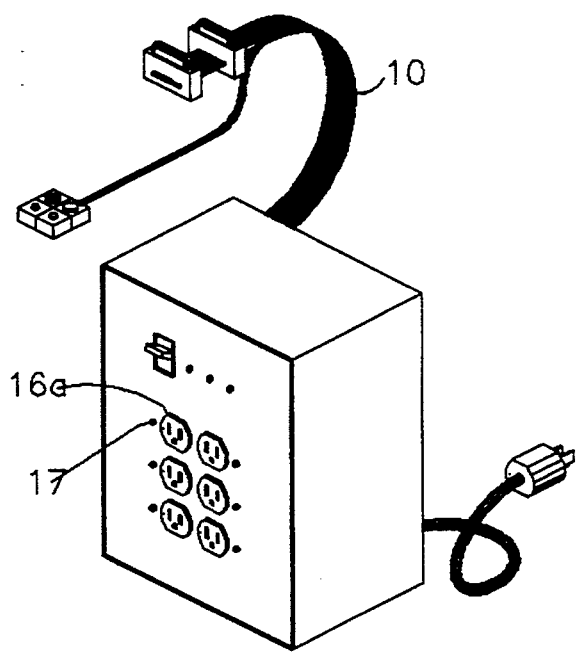
FIG. 6a is a perspective view of an embodiment of the invention in an Uninterruptible Power Supply (UPS).

Other embodiments of this invention include the integration of it into an UPS as shown in FIG. 6a. In this form it may shed some of it's parts like the phone and independent device connectors but may keep the status lights (e.g., 17) for each outlet connector ( e.g., 16a). The Interrupt request connector is no longer necessary because the signal is carried internally to the control cable 10, nor the power cable and connector because the electric power is provided by the UPS, sometimes in use of it's battery.

Another embodiment can be in a surge suppressor or spike protector that are so popular nowadays for protecting computer equipment.

In every case, components may be added or changed to avert any unwanted electrostatic and electromagnetic interference that affects electronic equipment. Also, it is best if all the outlets are off when the apparatus is powered up. Therefore attention to these considerations is recommended.

Figure 6B:
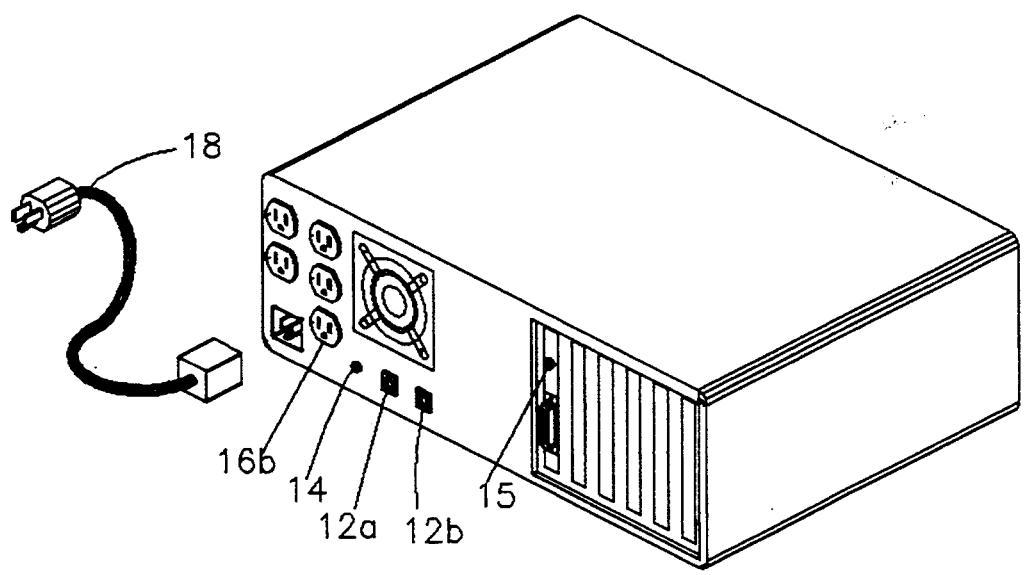
FIG. 6b is a perspective view of an embodiment of the invention in a computer.

FIG. 6b shows a perspective view of the rear of a personal computer. In this embodiment the first outlet connector is not necessary because the power provided by this outlet is internally connected to the computer's power supply circuits. Power is supplied first to the invention through the power cable 18 that is now the same power cable provided with the computer. The second outlet will be used for the monitor so it's connector 16b may be of such form as to receive the monitor's power connector. Independent device connector 14 and phone connectors 12a, 12b are not necessary but provide a great convenience for remote operation of the computer. The hardware interrupt connector 15 also can be dispensed because an IRQ signal can be sent directly to pin ten of the nearby parallel port connector. A signal to the independent device connector 14 can actually originate internally (it can be generated by an internal clock/calendar in the computer) making this connector unnecessary. All these connectors may be placed anywhere in the computer's housing but for simplicity (and perhaps interference) reasons they are better placed in the power supply housing. The user switches are now part of the front panel of the computer in the same fashion as a computer's reset switch. The user switch to turn the first two outlets on is now the reset switch. Pressure on this new reset switch can both power the computer and reset it. The controlling signals are now interchanged with a port without the use of external connectors, or even directly with the I/O Channel of the system board by rearranging the logic gates and routines to such fashion. Physically the logic gates can be placed on the system board (motherboard) or port adapter (expansion board).

A variation of an embodiment within a computer's power supply is where at least one outlet connector occupies the place of the typical power switch. This version should adapt well to existing computers without need to alter their case.

A different way to implement the logic circuitry is to replace the flip-flops with an addressable latch (e.g., 74259), in which case the routines and logic gates would have to be modified to set the outlets in a serial fashion rather than three at a time.

Although many outlet connectors have been shown in different embodiments, it should be obvious that a single outlet and connector can be sufficient to benefit from this invention (e.g., automatic printer outlet power).

Thus it has been shown the different ways of how the first principal object is accomplished. With this invention, flow of electric power can be managed in a "tailor made" fashion to satisfy different needs at the precise moment. It also helps relieve the user from the tediousness of operating equipment switches.

The second principal object is accomplished because it has been shown that any signal (a telephone ring signal, an independent device signal, a user switch signal, an equipment interrupt signal, a computer signal) is given control to turn on or off an outlet, or start a process to do that. All these functions are best included in one apparatus or controller to avoid the burden of extra expense in cost and work space.

The third principal object is accomplished because the parts needed to implement the invention are common and, by incorporating the invention into equipment normally found in a computer's environment (e.g., surge suppressor, UPS, computer, etc.), low cost is further achieved. Setup is easy. It can be as simple as plugging cables to their connectors, putting a diskette in the drive and entering "SWITCH 1" on the keyboard. And, because it uses commands akin to the operating system in the computer, there is no need to learn exotic rules and instruction of use. With this invention and a basic knowledge of the operating system, which most computer users have, control of the outlets is attained in a simpler and more flexible manner, in which even a casual user should have no difficulty in using.

Imagine a refrigerator with a manual switch to turn on and off, it would not be very practical because it would take all our attention to operate it effectively. A less dramatic but somewhat similar situation occurs with all the equipment power switches to tend to when using a computer. Peripheral devices and appliances such as: printer, plotter, digitizer, fax, laser copier, modem, lamps, coffee pot, radio, etc. are constantly being turned on and forgotten to turn off (or on) because our attention is on the application and not the power switches. In the process of improving the user's ability to control his surroundings is that this invention has it's place. Especially now that there is more hardware available to record and execute a sequence of commands pre-determined by the user. So this is a bridge in the existing gap between the computer and any electrically powered devices in it's environment. Envisioned is the day when peripheral devices will have shed their manual power switches.

Worthy of note is that this invention contributes to the energy saving efforts because it will power the devices only when needed, rather than using energy and equipment parts idly.

The foregoing description of the preferred embodiment of the invention has been presented for the purpose of illustration and description. It is not intended to be exhaustive or to limit the invention to the precise forms disclosed. Many variations and modifications are possible in light of the above teachings. For example: instead of a keyboard key combination, an independent device's hardware interrupt call (IRQ signal) or a software (program) call can be the one to activate the KSC Routine; a mouse or other means for data entry can be used to control the KSC Routine; the various commands and memory resident routines can be incorporated into the ROM BIOS; there can be two user switches per outlet or one that flips the outlet's status; the user switches can be foot switches or other; diodes 27c and 27b are absent when user switches 8c and 8d are to act only on flip-flops 28c, 28d, 28e and 28f; a timer alarm's low signal can be applied to the CLR pin instead of the PRE pin turning an outlet off; words can be the distinctive sounds heard with each action; the printer configuration character string can be contained in a disk file, etc. Therefore, it is intended that the scope of the invention be limited not by the above detailed description, but rather by the claims appended hereto.

```
OFF.COM                                                              NOTE: ALL NUMBERS ARE HEXADECIMAL
0000=E9 50 02 43 4F 50 45 4C 20 20 20 53 57 2D 30 30 00 00 00 00 1D 00 B8 08 02 00 2C 87 DB 87 DB 90
0020=0A 45 4C 45 43 54 52 49 43 20 4F 55 54 4C 45 54 20 4F 46 46 20 20 20 20 20 20 20 20 20 20 43 6F
0040=70 79 72 69 67 68 74 20 28 63 29 20 31 39 39 30 20 48 75 67 6F 20 4F 72 74 69 7A 2E 20 41 6C 6C
0060=20 72 69 67 68 74 73 20 72 65 73 65 72 76 65 64 2E 00 0A 20 46 6F 72 6D 61 74 3A 20 4F 46 46 20
0080=5B 5B 50 5D 47 5D 4E 5B 2F 53 5D 0D 0A 0A 20 20 57 68 65 72 65 3A 20 50 3D 50 61 72 61 6C 65 6C
00A0=6C 20 50 6F 72 74 20 4E 75 6D 62 65 72 20 28 31 2D 33 29 2C 20 64 65 66 61 75 6C 74 20 69 73 20
00C0=31 0D 0A 20 20 20 20 20 20 20 20 47 3D 4F 75 74 6C 65 74 20 47 72 6F 75 70 20 28 31 2D 34 29
00E0=2C 20 64 65 66 61 75 6C 74 20 69 73 20 31 0D 0A 20 20 20 20 20 20 20 20 4E 3D 4F 75 74 6C 65
0100=74 20 4E 75 6D 62 65 72 20 74 6F 20 62 65 20 74 75 72 6E 65 64 20 6F 66 66 20 28 31 2D 36 29 0D
0120=0A 20 20 20 20 20 20 20 20 53 3D 53 69 6C 65 6E 74 0D 0A 0A 41 6C 6C 20 76 61 72 69 61 62 6C
0140=65 73 20 65 78 63 65 70 74 20 4E 20 61 72 65 20 6F 70 74 69 6F 6E 61 6C 0A 0A 0D 45 78 61 6D 70
0160=6C 65 3A 20 4F 46 46 20 32 34 0D 0A 0A 20 20 57 69 6C 6C 20 74 75 72 6E 20 6F 66 66 20 6F 75 74
0180=6C 65 74 20 6E 75 6D 62 65 72 20 34 20 69 6E 20 74 68 65 20 73 65 63 6F 6E 64 20 67 72 6F 75 70
01A0=20 61 74 74 61 63 68 65 64 20 74 6F 20 70 61 72 61 6C 65 6C 6C 20 70 6F 72 74 20 31 24 1A 0D 0A
01C0=0A 07 4E 6F 6E 65 78 69 73 74 65 6E 74 20 50 61 72 61 6C 65 6C 6C 20 50 6F 72 74 24 1A 0D 0A 0A
01E0=07 49 6E 76 61 6C 69 64 20 50 61 72 61 6C 65 6C 6C 20 50 6F 72 74 20 4E 75 6D 62 65 72 24 1A 0D
0200=0A 0A 07 49 6E 76 61 6C 69 64 20 47 72 6F 75 70 20 4E 75 6D 62 65 72 24 1A 0D 0A 0A 07 4E 6F 6E
0220=65 78 69 73 74 65 6E 74 20 47 72 6F 75 70 20 4E 75 6D 62 65 72 24 1A 0D 0A 0A 07 49 6E 76 61 6C
0240=69 64 20 4F 75 74 6C 65 74 20 4E 75 6D 62 65 72 24 1A 41 32 ED 2E 8A 0E 80 00 83 F9 00 75 03 E9
0260=F8 00 80 26 52 03 FE B4 20 E8 2E 02 B1 00 B7 31 B3 31 B4 31 AC 3C 36 77 2E 3C 31 72 2A B1 01 8A
0280=FB 8A DC 8A E0 AC 3C 36 77 1D 3C 31 72 19 B1 01 8A FB 8A DC 8A E0 AC 3C 36 77 0C 3C 31 72 08 B1
02A0=01 8A FB 8A DC 8A E0 80 F9 00 75 0B BA 37 03 80 0E 52 03 20 E9 A3 00 80 EF 31 80 EB 30 80 EC 31
02C0=B0 06 86 DC 80 FC 05 72 0B BA FF 02 80 0E 52 03 08 E9 86 00 F6 E4 02 C3 A2 15 01 32 E4 8A C7 3C
02E0=03 72 0B BA DD 02 80 0E 52 03 02 EB 6D 90 A3 12 01 06 D1 E0 88 F8 B8 40 00 8E C0 26 8B 45 08 07
0300=0B C0 75 0B 80 0E 52 03 04 BA BE 02 EB 4C 90 A3 10 01 B4 2F E8 83 01 3C 00 74 11 AC 3C 53 77 08
0320=72 0A 26 80 26 1A 01 F7 2C 20 EB F0 E8 44 00 F6 C4 80 75 08 F6 C4 40 74 03 EB 0C 90 BA 19 03 80
0340=0E 52 03 10 EB 14 90 F6 D0 22 E0 F6 D0 88 26 52 03 80 E4 3F E8 7B 00 EB 13 90 52 BA 20 01 B4 09
0360=CD 21 5A F6 06 52 03 01 75 02 CD 21 B4 4C A0 52 03 CD 21 E8 3F 00 FE CB 78 3A D0 E3 D0 E3 D0 E3
0380=D0 E3 E8 9F 00 80 CB 0F E8 CD 00 E8 AA 00 B9 08 00 8A C1 FE C8 E8 C0 00 8B 16 10 01 42 EC D0 E0
03A0=D0 E0 D0 E0 D1 E0 E2 E9 E8 9D 00 E8 7F 00 B0 01 8A CF D2 C0 C3 32 E4 A0 15 01 B5 06 F6 F5 88 D8
03C0=B5 42 F6 E5 BF 1B 01 3D 00 00 74 03 05 18 00 03 F8 C3 80 FB FF 74 37 B9 FC 08 22 C4 74 03 B9 BC
03E0=02 E8 8D 00 E8 3D 00 8A C4 E8 23 00 80 CB 4F E8 66 00 E8 43 00 E8 50 00 8A C4 D0 E8 E8 10 00 80
0400=F3 C0 E8 53 00 E8 30 00 E8 3D 00 E8 1F 00 C3 D0 C4 D0 C4 D1 C8 D0 C8 D1 C8 D0 C8 D1 C0 D1 C0 D0
0420=CC D0 CC C3 8B 16 10 01 EC A2 19 01 C3 A0 19 01 8B 16 10 01 E8 2D 00 C3 8B 16 10 01 83 C2 02 EC
0440=0C 02 24 F7 E8 1D 00 C3 8B 16 10 01 83 C2 02 EC 24 FD 0C 08 E8 0D 00 C3 0C F8 22 C3 8B 16 10 01
```

```
0460=E8 01 00 C3 EE C6 06 16 01 01 FE 0E 16 01 75 FA C3 F6 06 1A 01 08 74 21 B0 B6 E6 43 8A C1 E6 42
0480=8A C5 E6 42 E4 61 8A C8 0C 03 E6 61 8A C1 B9 00 50 86 C4 86 C4 E2 FA E6 61 C3 32 ED 2E 8A 0E 80
04A0=00 BE 81 00 AC 3A C4 74 04 E2 F9 32 C0 32 E4 C3
```

ON.COM
NOTE: ALL NUMBERS ARE HEXADECIMAL

```
0000=E9 4C 02 43 4F 50 45 4C 20 20 20 53 57 2D 30 31 00 00 00 00 1D 00 B8 08 02 00 2C 87 DB 87 DB 90
0020=0A 45 4C 45 43 54 52 49 43 20 4F 55 54 4C 45 54 20 4F 4E 20 20 20 20 20 20 20 20 20 20 20 43 6F
0040=70 79 72 69 67 68 74 20 28 63 29 20 31 39 39 30 20 48 75 67 6F 20 4F 72 74 69 7A 2E 20 41 6C 6C
0060=20 72 69 67 68 74 73 20 72 65 73 65 72 76 65 64 2E 0D 0A 20 46 6F 72 6D 61 74 3A 20 4F 4E 20 5B
0080=5B 50 5D 47 5D 4E 5B 2F 53 5D 0D 0A 0A 20 20 57 68 65 72 65 3A 20 50 3D 50 61 72 61 6C 65 6C 6C
00A0=20 50 6F 72 74 20 4E 75 6D 62 65 72 20 28 31 2D 33 29 2C 20 64 65 66 61 75 6C 74 20 69 73 20 31
00C0=0D 0A 20 20 20 20 20 20 20 20 20 47 3D 4F 75 74 6C 65 74 20 47 72 6F 75 70 20 28 31 2D 34 29 2C
00E0=20 64 65 66 61 75 6C 74 20 69 73 20 31 0D 0A 20 20 20 20 20 20 20 20 20 4E 3D 4F 75 74 6C 65 74
0100=20 4E 75 6D 62 65 72 20 74 6F 20 62 65 20 74 75 72 6E 65 64 20 6F 6E 20 28 31 2D 36 29 0D 0A 20
0120=20 20 20 20 20 20 20 20 53 3D 53 69 6C 65 6E 74 0D 0A 0A 41 6C 6C 20 76 61 72 69 61 62 6C 65 73
0140=20 65 78 63 65 70 74 20 4E 20 61 72 65 20 6F 70 74 69 6F 6E 61 6C 0A 0A 0D 45 78 61 6D 70 6C 65
0160=3A 20 4F 4E 20 32 31 32 0D 0A 0A 20 20 57 69 6C 6C 20 74 75 72 6E 20 6F 6E 20 6F 75 74 6C 65 74
0180=20 6E 75 6D 62 65 72 20 32 20 69 6E 20 74 68 65 20 66 69 72 73 74 20 67 72 6F 75 70 20 61 74 74
01A0=61 63 68 65 64 20 74 6F 20 70 61 72 61 6C 65 6C 6C 20 70 6F 72 74 20 32 24 1A 0D 0A 0A 07 4E 6F
01C0=6E 65 78 69 73 74 65 6E 74 20 50 61 72 61 6C 65 6C 6C 20 50 6F 72 74 24 1A 0D 0A 0A 07 49 6E 76
01E0=61 6C 69 64 20 50 61 72 61 6C 65 6C 6C 20 50 6F 72 74 20 4E 75 6D 62 65 72 24 1A 0D 0A 0A 07 49
0200=6E 76 61 6C 69 64 20 47 72 6F 75 70 20 4E 75 6D 62 65 72 24 1A 0D 0A 0A 07 4E 6F 6E 65 78 69 73
0220=74 65 6E 74 20 47 72 6F 75 70 20 4E 75 6D 62 65 72 24 1A 0D 0A 0A 07 49 6E 76 61 6C 69 64 20 4F
0240=75 74 6C 65 74 20 4E 75 6D 62 65 72 24 1A 41 32 ED 2E 8A 0E 80 00 83 F9 00 75 03 E9 F4 00 80 26
0260=4E 03 FE B4 20 E8 2A 02 B1 00 B7 31 B3 31 B4 31 AC 3C 36 77 2E 3C 31 72 2A B1 01 8A FB 8A DC 8A
0280=E0 AC 3C 36 77 1D 3C 31 72 19 B1 01 8A FB 8A DC 8A E0 AC 3C 36 77 0C 3C 31 72 08 B1 01 8A FB 8A
02A0=DC 8A E0 80 F9 00 75 0B BA 33 03 80 0E 4E 03 20 E9 9F 00 80 EF 31 80 EB 30 80 EC 31 B0 06 86 DC
02C0=80 FC 05 72 0B BA FB 02 80 0E 4E 03 08 E9 82 00 F6 E4 02 C3 A2 15 01 32 E4 8A C7 3C 03 72 0B BA
02E0=D9 02 80 0E 4E 03 02 EB 69 90 A3 12 01 06 D1 E0 88 F8 B8 40 00 8E C0 26 8B 45 08 07 0B C0 75 0B
0300=80 0E 4E 03 04 BA BA 02 EB 48 90 A3 10 01 B4 2F E8 7F 01 3C 00 74 11 AC 3C 53 77 08 72 0A 26 80
0320=26 1A 01 F7 2C 20 EB F0 E8 40 00 F6 C4 80 75 08 F6 C4 40 74 03 EB 0C 90 BA 15 03 80 0E 4E 03 10
0340=EB 10 90 0A E0 88 26 4E 03 80 E4 3F E8 7B 00 EB 13 90 52 BA 20 01 B4 09 CD 21 5A F6 06 4E 03 01
0360=75 02 CD 21 B4 4C A0 4E 03 CD 21 E8 3F 00 FE CB 78 3A D0 E3 D0 E3 D0 E3 D0 E3 E8 9F 00 80 CB 0F
0380=E8 CD 00 E8 AA 00 B9 08 00 8A C1 FE C8 E8 C0 00 88 16 10 01 42 EC D0 E0 D0 E0 D0 E0 D1 E0 E2 E9
03A0=E8 9D 00 E8 7F 00 B0 01 8A CF D2 C0 C3 32 E4 A0 15 01 B5 06 F6 F5 8B D8 B5 42 F6 E5 BF 1B 01 3D
03C0=00 00 74 03 05 18 00 03 F8 C3 80 FB FF 74 37 B9 FC 08 22 C4 74 03 B9 BC 02 E8 8D 00 E8 3D 00 8A
03E0=C4 E8 23 00 80 CB 4F E8 66 00 E8 43 00 E8 50 00 8A C4 D0 E8 E8 10 00 80 F3 C0 E8 53 00 E8 30 00
0400=E8 3D 00 E8 1F 00 C3 D0 C4 D0 C4 D1 C8 D0 C8 D1 C8 D0 C8 D1 C0 D1 C0 D0 CC D0 CC C3 8B 16 10 01
0420=EC A2 19 01 C3 A0 19 01 8B 16 10 01 E8 2D 00 C3 8B 16 10 01 83 C2 02 EC 0C 02 24 F7 E8 1D 00 C3
0440=8B 16 10 01 83 C2 02 EC 24 FD 0C 08 E8 0D 00 C3 0C F8 22 C3 8B 16 10 01 E8 01 00 C3 EE C6 06 16
0460=01 01 FE 0E 16 01 75 FA C3 F6 06 1A 01 08 74 21 B0 B6 E6 43 8A C1 E6 42 8A C5 E6 42 E4 61 8A C8
0480=0C 03 E6 61 8A C1 B9 00 50 86 C4 86 C4 E2 FA E6 61 C3 32 ED 2E 8A 0E 80 00 BE 81 00 AC 3A C4 74
04A0=04 E2 F9 32 C0 32 E4 C3
```

FLIP.COM
NOTE: ALL NUMBERS ARE HEXADECIMAL

```
0000=E9 73 02 43 4F 50 45 4C 20 20 20 53 57 2D 30 32 00 00 00 00 1D 00 B8 08 02 00 2C 87 DB 87 DB 90
0020=0A 45 4C 45 43 54 52 49 43 20 4F 55 54 4C 45 54 20 46 4C 49 50 20 20 20 20 20 20 20 20 20 43 6F
0040=70 79 72 69 67 68 74 20 28 63 29 20 31 39 39 30 20 48 75 67 6F 20 4F 72 74 69 7A 2E 20 41 6C 6C
0060=20 72 69 67 68 74 73 20 72 65 73 65 72 76 65 64 2E 0D 0A 20 46 6F 72 6D 61 74 3A 20 46 4C 49 50
0080=20 5B 5B 50 5D 47 5D 4E 5B 2F 53 5D 0D 0A 0A 20 20 57 68 65 72 65 3A 20 50 3D 50 61 72 61 6C 65
00A0=6C 6C 20 50 6F 72 74 20 4E 75 6D 62 65 72 20 28 31 2D 33 29 2C 20 64 65 66 61 75 6C 74 20 69 73
00C0=20 31 0D 0A 20 20 20 20 20 20 20 20 20 47 3D 4F 75 74 6C 65 74 20 47 72 6F 75 70 20 28 31 2D 34
00E0=29 2C 20 64 65 66 61 75 6C 74 20 69 73 20 31 0D 0A 20 20 20 20 20 20 20 20 20 4E 3D 4F 75 74 6C
0100=65 74 20 4E 75 6D 62 65 72 20 74 6F 20 62 65 20 74 75 72 6E 65 64 20 6F 6E 20 28 31 2D 36 29 0D
0120=0A 20 20 20 20 20 20 20 20 20 53 3D 53 69 6C 65 6E 74 0D 0A 0A 41 6C 6C 20 76 61 72 69 61 62 6C
0140=65 73 20 65 78 63 65 70 74 20 4E 20 61 72 65 20 6F 70 74 69 6F 6E 61 6C 0A 0A 0D 45 78 61 6D 70
```

```
0160=6C 65 3A 20 46 4C 49 50 20 32 31 32 2F 53 0D 0A 0A 20 20 57 49 6C 6C 20 63 68 61 6E 67 65 20 74
0180=6F 20 74 68 65 20 6F 70 70 6F 73 69 74 65 20 73 74 61 74 65 20 6F 75 74 6C 65 74 20 6E 75 6D 62
01A0=65 72 20 32 20 69 6E 20 74 68 65 20 66 69 72 73 74 20 67 72 6F 75 70 0D 0A 20 61 74 74 61 63 68
01C0=65 64 20 74 6F 20 70 61 72 61 6C 6C 65 6C 6C 20 70 6F 72 74 20 32 2C 20 73 69 6C 65 6E 74 6C 79 24
01E0=1A 0D 0A 0A 07 4E 6F 6E 65 78 69 73 74 65 6E 74 20 50 61 72 61 6C 65 6C 6C 20 50 6F 72 74 24 1A
0200=0D 0A 0A 07 49 6E 76 61 6C 69 64 20 50 61 72 61 6C 6C 65 6C 6C 20 50 6F 72 74 20 4E 75 6D 62 65 72
0220=24 1A 0D 0A 0A 07 49 6E 76 61 6C 69 64 20 47 72 6F 75 70 20 4E 75 6D 62 65 72 24 1A 0D 0A 0A 07
0240=4E 6F 6E 65 78 69 73 74 65 6E 74 20 47 72 6F 75 70 20 4E 75 6D 62 65 72 24 1A 0D 0A 0A 07 49 6E
0260=76 61 6C 69 64 20 4F 75 74 6C 65 74 20 4E 75 6D 62 65 72 24 1A 41 32 ED 2E 8A 0E 80 00 83 F9 00
0280=75 03 E9 F4 00 80 26 75 03 FE B4 20 E8 2A 02 B1 00 B7 31 B3 31 B4 31 AC 3C 36 77 2E 3C 31 72 2A
02A0=B1 01 8A FB 8A DC 8A E0 AC 3C 36 77 1D 3C 31 72 19 B1 01 8A FB 8A DC 8A E0 AC 3C 36 77 0C 3C 31
02C0=72 08 B1 01 8A FB 8A DC 8A E0 80 F9 00 75 0B BA 5A 03 80 0E 75 03 20 E9 9F 00 80 EF 31 80 EB 30
02E0=80 EC 31 B0 06 86 DC 80 FC 05 72 0B BA 22 03 80 0E 75 03 08 E9 82 00 F6 E4 02 C3 A2 15 01 32 E4
0300=8A C7 3C 03 72 0B BA 00 03 80 0E 75 03 02 EB 69 90 A3 12 01 06 D1 E0 8B F8 B8 40 00 8E C0 26 8B
0320=45 08 07 0B C0 75 0B 80 0E 75 03 04 BA E1 02 EB 48 90 A3 10 01 B4 2F E8 7F 01 3C 00 74 11 AC 3C
0340=53 77 08 72 0A 26 80 26 1A 01 F7 2C 20 EB F0 E8 40 00 F6 C4 80 75 08 F6 C4 40 74 03 EB 0C 90 BA
0360=3C 03 80 0E 75 03 10 EB 10 90 32 E0 88 26 75 03 80 E4 3F E8 7B 00 EB 13 90 52 BA 20 01 B4 09 CD
0380=21 5A F6 06 75 03 01 75 02 CD 21 B4 4C A0 75 03 CD 21 E8 3F 00 FE CB 78 3A D0 E3 D0 E3 D0 E3 D0
03A0=E3 E8 9F 00 80 CB 0F E8 CD 00 E8 AA 00 B9 08 00 8A C1 FE C8 E8 C0 00 8B 16 10 01 42 EC D0 E0 D0
03C0=E0 D0 E0 D1 E0 E2 E9 E8 9D 00 E8 7F 00 B0 01 8A CF D2 C0 C3 32 E4 A0 15 01 B5 06 F6 F5 8B D8 B5
03E0=42 F6 E5 BF 1B 01 3D 00 00 74 03 05 18 00 03 F8 C3 80 FB FF 74 37 B9 FC 08 22 C4 74 03 B9 BC 02
0400=E8 8D 00 E8 3D 00 8A C4 E8 23 00 80 CB 4F E8 66 00 E8 43 00 E8 50 00 8A C4 D0 E8 E8 10 00 80 F3
0420=C0 E8 53 00 E8 30 00 E8 3D 00 E8 1F 00 C3 D0 C4 D0 C4 D1 C8 D0 C8 D1 C8 D0 C8 D1 C0 D1 C0 D0 CC
0440=D0 CC C3 8B 16 10 01 EC A2 19 01 C3 A0 19 01 8B 16 10 01 E8 2D 00 C3 8B 16 10 01 83 C2 02 EC 0C
0460=02 24 F7 E8 1D 00 C3 8B 16 10 01 83 C2 02 EC 24 FD 0C 08 E8 0D 00 C3 0C F8 22 C3 8B 16 10 01 E8
0480=01 00 C3 EE C6 06 16 01 01 FE 0E 16 01 75 FA C3 F6 06 1A 01 08 74 21 B0 B6 E6 43 8A C1 E6 42 8A
04A0=C5 E6 42 E4 61 8A C8 0C 03 E6 61 8A C1 B9 00 50 86 C4 86 C4 E2 FA E6 61 C3 32 ED 2E 8A 0E 80 00
04C0=BE 81 00 AC 3A C4 74 04 E2 F9 32 C0 32 E4 C3
```

STATUS.COM                                                    NOTE: ALL NUMBERS ARE HEXADECIMAL

```
0000=E9 77 02 43 4F 50 45 4C 20 20 20 53 57 2D 30 33 00 00 00 00 1D 00 B8 08 02 00 2C 87 DB 87 DB 90
0020=0A 45 4C 45 43 54 52 49 43 20 4F 55 54 4C 45 54 20 53 54 41 54 55 53 20 20 20 20 20 20 20 43 6F
0040=70 79 72 69 67 68 74 20 28 63 29 20 31 39 39 30 20 48 75 67 6F 20 4F 72 74 69 7A 2E 20 41 6C 6C
0060=20 72 69 67 68 74 73 20 72 65 73 65 72 76 65 64 2E 0D 0A 20 46 6F 72 6D 61 74 3A 20 53 54 41 54
0080=55 53 20 5B 5B 50 5D 47 5D 4E 5B 2F 53 5D 0D 0A 0A 20 20 57 68 65 72 65 3A 20 50 3D 50 61 72 61
00A0=6C 65 6C 6C 20 50 6F 72 74 20 4E 75 6D 62 65 72 20 28 31 2D 33 29 2C 20 64 65 66 61 75 6C 74 20
00C0=69 73 20 31 0D 0A 20 20 20 20 20 20 20 20 20 47 3D 4F 75 74 6C 65 74 20 47 72 6F 75 70 20 28 31
00E0=2D 34 29 2C 20 64 65 66 61 75 6C 74 20 69 73 20 31 0D 0A 20 20 20 20 20 20 20 20 20 4E 3D 4F 75
0100=74 6C 65 74 20 4E 75 6D 62 65 72 20 74 6F 20 62 65 20 74 75 72 6E 65 64 20 6F 6E 20 28 31 2D 36
0120=29 0D 0A 20 20 20 20 20 20 20 20 20 53 3D 53 69 6C 65 6E 74 0D 0A 0A 41 6C 6C 20 76 61 72 69 61
0140=62 6C 65 73 20 65 78 63 65 70 74 20 4E 20 61 72 65 20 6F 70 74 69 6F 6E 61 6C 0A 0A 0D 45 78 61
0160=6D 70 6C 65 3A 20 53 54 41 54 55 53 20 32 31 34 0D 0A 0A 20 20 57 69 6C 6C 20 69 6E 66 6F 72 6D
0180=20 74 68 65 20 73 77 69 74 63 68 20 73 65 74 74 69 6E 67 20 6F 66 20 74 68 65 20 66 6F 75 72 74
01A0=68 20 6F 75 74 6C 65 74 20 6F 66 20 74 68 65 20 66 69 72 73 74 20 67 72 6F 75 70 0D 0A 20 61 74
01C0=74 61 63 68 65 64 20 74 6F 20 70 61 72 61 6C 65 6C 6C 20 70 6F 72 74 20 32 24 1A 0D 0A 0A 07 4E
01E0=6F 6E 65 78 69 73 74 65 6E 74 20 50 61 72 61 6C 65 6C 6C 20 50 6F 72 74 24 1A 0D 0A 0A 07 49 6E
0200=76 61 6C 69 64 20 50 61 72 61 6C 65 6C 6C 20 50 6F 72 74 20 4E 75 6D 62 65 72 24 1A 0D 0A 0A 07
0220=49 6E 76 61 6C 69 64 20 47 72 6F 75 70 20 4E 75 6D 62 65 72 24 1A 0D 0A 0A 07 4E 6F 6E 65 78 69
0240=73 74 65 6E 74 20 47 72 6F 75 70 20 4E 75 6D 62 65 72 24 1A 0D 0A 0A 07 49 6E 76 61 6C 69 64 20
0260=4F 75 74 6C 65 74 20 4E 75 6D 62 65 72 24 1A 4F 4E 20 24 1A 4F 46 46 24 1A 41 32 ED 2E 8A 0E 80
0280=00 83 F9 00 75 03 E9 1F 01 80 26 79 03 FE B4 20 E8 55 02 B1 00 B7 31 B3 31 B4 31 AC 3C 36 77 2E
02A0=3C 31 72 2A B1 01 8A FB 8A DC 8A E0 AC 3C 36 77 1D 3C 31 72 19 B1 01 8A FB 8A DC 8A E0 AC 3C 36
02C0=77 0C 3C 31 72 08 B1 01 8A FB 8A DC 8A E0 80 F9 00 75 0B BA 54 03 80 0E 79 03 20 E9 CA 00 80 EF
02E0=31 80 EB 30 80 EC 31 B0 06 86 DC 80 FC 05 72 0B BA 1C 03 80 0E 79 03 08 E9 AD 00 F6 E4 02 C3 A2
0300=15 01 32 E4 8A C7 3C 03 72 0B BA FA 02 80 0E 79 03 02 E9 93 00 A3 12 01 06 D1 E0 8B F8 B8 40 00
0320=8E C0 26 8B 45 08 07 0B C0 75 0B 80 0E 79 03 04 BA DB 02 EB 73 90 A3 10 01 B4 2F E8 AA 01 3C 00
```

```
0340=74 1B AC 3C 53 75 06 26 80 26 1A 01 F7 3C 41 77 08 72 0A 26 80 0E 79 03 80 2C 20 EB E6 E8 61 00
0360=F6 C4 80 75 08 F6 C4 40 74 03 EB 0C 90 BA 36 03 80 0E 79 03 10 EB 31 90 80 26 79 03 80 84 C4 BA
0380=74 03 74 08 80 0E 79 03 01 BA 6F 03 52 F6 06 79 03 80 75 04 88 26 79 03 80 26 79 03 3F E8 80 00
03A0=5A B4 09 CD 21 EB 13 90 52 BA 20 01 B4 09 CD 21 5A F6 06 79 03 01 75 02 CD 21 B4 4C A0 79 03 CD
03C0=21 E8 3F 00 FE CB 78 3A D0 E3 D0 E3 D0 E3 D0 E3 E8 9F 00 80 CB 0F E8 CD 00 E8 AA 00 B9 08 00 8A
03E0=C1 FE C8 E8 C0 00 8B 16 10 01 42 EC D0 E0 D0 E0 D0 E0 D1 E0 E2 E9 E8 9D 00 E8 7F 00 B0 01 8A CF
0400=D2 C0 C3 32 E4 A0 15 01 B5 06 F6 F5 8B D8 B5 42 F6 E5 BF 1B 01 3D 00 00 74 03 05 18 00 03 F8 C3
0420=80 FB FF 74 37 B9 FC 08 22 C4 74 03 B9 BC 02 E8 8D 00 E8 3D 00 8A C4 E8 23 00 80 CB 4F E8 66 00
0440=E8 43 00 E8 50 00 8A C4 D0 E8 E8 10 00 80 F3 C0 E8 53 00 E8 30 00 E8 3D 00 E8 1F 00 C3 D0 C4 D0
0460=C4 D1 C8 D0 C8 D1 C8 D0 C8 D1 C0 D1 C0 D0 CC D0 CC C3 8B 16 10 01 EC A2 19 01 C3 A0 19 01 8B 16
0480=10 01 E8 2D 00 C3 8B 16 10 01 83 C2 02 EC 0C 02 24 F7 E8 1D 00 C3 8B 16 10 01 83 C2 02 EC 24 FD
04A0=0C 08 E8 0D 00 C3 0C F8 22 C3 8B 16 10 01 E8 01 00 C3 EE C6 06 16 01 01 FE 0E 16 01 75 FA C3 F6
04C0=06 1A 01 08 74 21 B0 B6 E6 43 8A C1 E6 42 8A C5 E6 42 E4 61 8A C8 0C 03 E6 61 8A C1 B9 00 50 86
04E0=C4 86 C4 E2 FA E6 61 C3 32 ED 2E 8A 0E 80 00 BE 81 00 AC 3A C4 74 04 E2 F9 32 C0 32 E4 C3
```

INT.COM                                                           NOTE: ALL NUMBERS ARE HEXADECIMAL

```
0000=E9 6B 05 43 4F 50 45 4C 20 20 20 53 57 2D 30 34 00 00 00 00 1D 00 B8 08 60 FF 2C 00 2E 89 2E 90
0020=03 BD 90 03 E8 19 02 C6 06 19 01 00 8B 3E 12 01 80 FC 80 72 02 88 FA 83 FF 03 72 08 80 0E 19 01
0040=02 E9 D6 00 D1 E7 26 88 9D 08 04 0B DB 75 08 80 0E 19 01 04 E9 C3 00 89 1E 10 01 80 E4 7F 80 FC
0060=03 77 10 0A C0 74 04 3C 19 72 08 80 0E 19 01 20 E9 A7 00 A2 16 01 04 05 A2 15 01 80 FC 00 74 3D
0080=80 FC 01 74 51 80 FC 02 74 61 80 FC 03 74 71 80 EC 03 80 FC 05 72 08 80 0E 19 01 08 EB 7C 90 B0
00A0=06 F6 E4 A2 15 01 E8 7E 00 F6 C4 80 75 67 F6 C4 40 74 62 8A 26 16 01 E8 BB 00 EB 53 90 E8 67 00
00C0=F6 C4 80 75 50 F6 C4 40 74 4B F6 D0 22 E0 F6 D0 E8 A2 00 EB 3A 90 E8 4E 00 F6 C4 80 75 37 F6 C4
00E0=40 74 32 0A E0 E8 8D 00 EB 25 90 E8 39 00 F6 C4 80 75 22 F6 C4 40 74 1D 32 E0 E8 78 00 EB 10 90
0100=E8 24 00 F6 C4 80 75 0D F6 C4 40 74 08 22 C4 80 E4 3F EB 0D 90 80 0E 19 01 10 8A 26 19 01 80 CC
0120=40 50 E8 46 01 58 CF E8 3F 00 FE CB 78 3A D0 E3 D0 E3 D0 E3 D0 E3 E8 8E 00 80 CB 0F E8 BE 00 E8
0140=9B 00 B9 08 00 8A C1 FE C8 E8 B1 00 8B 16 10 01 42 EC D0 E0 D0 E0 D0 E0 D1 E0 E2 E9 E8 8E 00 E8
0160=6F 00 B0 01 8A CF D2 C0 C3 32 E4 A0 15 01 B5 06 F6 F5 8B D8 C3 80 FB FF 74 37 B9 FC 08 22 C4 74
0180=03 B9 BC 02 E8 90 00 E8 3D 00 8A C4 E8 23 00 80 CB 4F E8 68 00 E8 45 00 E8 52 00 8A C4 D0 E8 E8
01A0=10 00 80 F3 C0 E8 55 00 E8 32 00 E8 3F 00 E8 20 00 C3 D0 C4 D0 C4 D1 C8 D0 C8 D1 C8 D0 C8 D1 C0
01C0=D1 C0 D0 CC D0 CC C3 8B 16 10 01 EC 2E 88 46 12 C3 2E 8A 46 12 8B 16 10 01 E8 2D 00 C3 8B 16 10
01E0=01 83 C2 02 EC 0C 02 24 F7 E8 1D 00 C3 8B 16 10 01 83 C2 02 EC 24 FD 0C 08 E8 0D 00 C3 0C F8 22
0200=C3 8B 16 10 01 E8 01 00 C3 EE C6 06 D4 03 01 90 FE 0E D4 03 75 FA C3 F6 06 1A 01 08 74 21 B0 B6
0220=E6 43 8A C1 E6 42 8A C5 E6 42 E4 61 8A C8 0C 03 E6 61 8A C1 B9 00 50 86 C4 86 C4 E2 FA E6 61 C3
0240=2E 8C 5E 02 2E 89 46 04 2E 89 76 06 2E 89 7E 08 2E 89 56 0A 2E 89 4E 0C 2E 89 5E 0E 2E 8C 46 10
0260=BB 00 00 8E C3 8C CB 8E DB FC C3 2E 8E 46 10 2E 8B 5E 0E 2E 8B 4E 0C 2E 8B 56 0A 2E 8B 7E 08 2E
0280=8B 76 06 2E 8B 46 04 2E 8E 5E 02 2E 8B 6E 00 C3 00 00 00 00 00 00 00 00 00 00 00 00 00 00 00 00
02A0=00 00 00 00 00 00 00 00 00 00 00 00 00 00 00 00 00 00 00 00 00 00 00 00 00 00 00 00 00 00 00 00
02C0=00 00 00 00 00 00 00 00 00 00 00 00 00 00 00 00 00 00 00 00 00 00 00 7F 00 87 DB 87 DB 87 DB 90
02E0=0A 45 4C 45 43 54 52 49 43 20 4F 55 54 4C 45 54 20 49 4E 54 20 52 4F 55 54 49 4E 45 20 20 43 6F
0300=70 79 72 69 67 68 74 20 28 63 29 20 31 39 39 30 20 48 75 67 6F 20 4F 72 74 69 7A 2E 20 41 6C 6C
0320=20 72 69 67 68 74 73 20 72 65 73 65 72 76 65 64 2E 0D 0A 20 46 6F 72 6D 61 74 3A 20 49 4E 54 20
0340=50 20 5B 2F 4E 78 78 5D 5B 2F 42 5D 0D 0A 20 20 57 68 65 72 65 3A 20 50 3D 50 61 72 61 6C 65 6C
0360=6C 20 50 6F 72 74 20 4E 75 6D 62 65 72 20 28 31 2D 33 29 0D 0A 20 20 20 20 20 20 20 20 20 4E 3D
0380=50 72 65 66 69 78 20 66 6F 72 20 69 6E 74 65 72 72 75 70 74 20 6E 75 6D 62 65 72 0D 0A 20 20 20
03A0=20 20 20 20 20 78 78 3D 49 6E 74 65 72 75 70 74 20 6E 75 6D 62 65 72 20 69 6E 20 68 65 78 61 64
03C0=65 63 69 6D 61 6C 20 66 6F 72 6D 20 28 64 65 66 61 75 6C 74 20 69 73 20 36 30 29 0D 0A 20 20 20
03E0=20 20 20 20 20 20 42 3D 53 6F 75 6E 64 20 28 53 20 66 6F 72 20 73 69 6C 65 6E 74 2C 20 42 20 66
0400=6F 72 20 62 65 65 70 29 0D 0A 0A 41 6C 6C 20 76 61 72 69 61 62 6C 65 73 20 65 78 63 65 70 74 20
0420=50 20 61 72 65 20 6F 70 74 69 6F 6E 61 6C 0A 0A 0D 45 78 61 6D 70 6C 65 3A 20 49 4E 54 20 31 2F
0440=4E 36 32 2F 53 0D 0A 20 20 57 69 6C 6C 20 69 6E 73 74 61 6C 6C 20 64 72 69 76 65 72 20 66 6F 72
0460=20 50 61 72 61 6C 65 6C 6C 20 50 6F 72 74 20 31 20 74 6F 20 72 65 73 70 6F 6E 64 20 74 6F 20 69
0480=6E 74 65 72 72 75 70 74 20 36 32 48 20 73 69 6C 65 6E 74 6C 79 24 1A 0D 0A 0A 52 65 73 69 64 65
04A0=6E 74 20 50 6F 72 74 69 6F 6E 20 41 6C 72 65 61 64 79 20 49 6E 73 74 61 6C 6C 65 64 20 66 6F 72
04C0=20 50 6F 72 74 20 24 1A 0D 0A 0A 07 4E 6F 6E 65 78 69 73 74 65 6E 74 20 50 61 72 61 6C 65 6C 6C
04E0=20 50 6F 72 74 24 1A 0D 0A 0A 07 49 6E 76 61 6C 69 64 20 50 61 72 61 6C 65 6C 6C 20 50 6F 72 74
```

```
0500=20 4E 75 6D 62 65 72 24 1A 0D 0A 0A 52 65 73 69 64 65 6E 74 20 50 6F 72 74 69 6F 6E 20 4E 6F 74
0520=20 49 6E 73 74 61 6C 6C 65 64 24 1A 0D 0A 0A 52 65 73 69 64 65 6E 74 20 50 6F 72 74 69 6F 6E 20
0540=49 6E 73 74 61 6C 6C 65 64 20 66 6F 72 20 50 6F 72 74 20 24 1A 0D 0A 49 6E 74 65 72 72 75 70 74
0560=20 6E 75 6D 62 65 72 20 69 73 20 24 1A 01 F6 16 00 01 32 ED 2E 8A 0E 80 00 E3 3B 80 26 6D 06 FE
0580=80 0E 6D 06 02 B4 20 E8 8F 01 AC 3C 31 72 27 3C 33 77 23 2C 31 26 A3 12 01 80 26 6D 06 FD 06 D1
05A0=E0 8B F8 B8 40 00 8E C0 26 8B 45 08 07 0B C0 75 41 80 0E 6D 06 04 BA E0 03 B4 09 CD 21 B9 10 00
05C0=80 0E 6D 06 80 E8 CF 00 B4 09 BA E7 05 F6 06 6D 06 04 74 03 BA C8 05 F6 06 6D 06 01 75 05 CD 21
05E0=EB 08 90 F6 06 6D 06 20 75 05 BA 09 06 CD 21 EB 7B 90 A3 10 01 B9 14 00 E8 9C 00 D0 26 6D 06 B4
0600=2F E8 15 01 3C 00 75 03 EB 2A 90 AC 3C 53 75 06 26 80 26 1A 01 F7 3C 4E 75 03 E8 56 00 3C 42 77
0620=08 72 0A 26 80 0E 1A 01 08 2C 20 EB DF B4 2F E8 F1 00 EB D0 1E 06 1F BA 1C 01 B4 25 A0 18 01 CD
0640=21 1F F6 06 6D 06 40 74 09 26 80 26 1A 01 BE EB 15 90 BA 2C 06 E8 7C 00 BA E6 03 B1 04 D3 EA A0
0660=6D 06 B4 31 CD 21 BA 97 05 E8 68 00 B4 4C A0 6D 06 CD 21 AC E8 B8 00 3C 10 74 19 8A E0 AC E8 AE
0680=00 86 E0 80 FC 10 74 08 8A DC B4 10 F6 E4 02 C3 26 A2 18 01 B0 21 C3 51 33 DB 8C C8 43 3B C3 8E
06A0=C3 74 2F BE 00 01 88 FE 59 51 F3 A6 0B C9 75 EC 50 1E 06 1F AD 1F 3D 00 00 58 74 E0 2E 80 0E 6D
06C0=06 20 2E F6 06 6D 06 80 74 08 BA 97 05 E8 04 00 EB CA 59 C3 50 B4 09 CD 21 26 8B 16 12 01 83 C2
06E0=31 B4 02 CD 21 BA 55 06 B4 09 CD 21 32 E4 26 A0 18 01 B2 10 F6 F2 E8 51 00 8A D0 8A C4 E8 4A 00
0700=8A F0 80 FA 30 74 04 B4 02 CD 21 8A D6 B4 02 CD 21 F6 06 6D 06 08 74 00 58 32 ED 2E 8A 0E 80 00
0720=BE 81 00 AC 3A C4 74 04 E2 F9 32 C0 32 E4 C3 2C 30 3C 0A 72 14 2C 07 3C 10 72 08 2C 20 3C 10 72
0740=02 B0 10 3C 09 77 02 B0 10 C3 04 30 3C 3A 72 02 04 07 C3
```

IRQ.COM                                                      NOTE: ALL NUMBERS ARE HEXADECIMAL

```
0000=E9 F9 09 43 4F 50 45 4C 20 20 53 57 2D 30 35 00 00 00 00 00 1D 00 1D 0F FF 28 00 20 20 20 20 20
0020=20 20 20 20 20 20 00 20 54 48 49 53 20 49 53 20 41 20 00 20 20 20 4E 4F 54 49 43 45 20 20 00 20
0040=20 20 4F 46 20 20 41 20 20 20 00 20 50 4F 57 45 52 20 4F 55 54 20 00 20 20 20 20 20 20 20 20 20
0060=20 20 00 20 59 4F 55 20 48 41 56 45 20 20 00 20 4C 45 53 53 20 54 48 41 4E 20 00 20 20 20 20 20
0080=35 20 20 20 20 20 00 20 20 4D 49 4E 55 54 45 53 20 20 00 20 52 45 4D 41 49 4E 49 4E 47 20 00 20
00A0=20 20 20 20 20 20 20 20 20 00 20 20 20 20 20 20 20 20 20 20 00 20 20 50 4C 45 41 53 45 20
00C0=20 20 00 20 54 55 52 4E 20 4F 46 46 20 20 00 20 20 41 4C 4C 20 54 48 45 20 20 00 20 20 45 51 55 49
00E0=50 4D 45 4E 54 20 00 20 20 20 20 20 20 20 20 20 20 00 20 20 59 4F 55 20 4D 41 59 20 20 00 20
0100=20 20 52 45 53 45 54 20 20 00 20 20 20 20 49 52 51 20 20 20 00 20 20 54 4F 20 53 54 4F 50
0120=20 20 00 20 20 54 55 52 4E 2D 4F 46 46 20 00 20 20 50 52 4F 43 45 53 53 20 00 20 20 20 20 20 20
0140=20 20 20 20 20 00 20 20 50 52 45 53 53 20 20 00 20 20 20 20 45 4E 44 20 20 20 20 00 20
0160=20 54 4F 20 53 54 4F 50 20 20 00 54 48 49 53 20 57 49 4E 44 4F 57 00 20 20 20 20 20 20 20 20
0180=20 20 00 2E 89 2E 80 06 BD 80 06 E8 24 03 3D 77 77 75 0E 81 F9 55 55 75 08 80 26 19 01 F9 E9 1C
01A0=01 F6 06 19 01 01 74 03 E9 07 01 80 0E 19 01 01 BA 21 00 EC 0C 80 EE 26 8B 16 10 01 42 42 EC 24
01C0=EF EE E8 8F 01 26 8B 07 A3 BC 06 8B 3E 12 01 D1 E7 26 8B 85 08 04 A3 10 01 F6 06 19 01 10 74 03
01E0=E9 89 00 26 A0 49 04 24 7F F6 06 19 01 20 74 04 3C 0A 77 78 80 0E 19 01 40 BB 07 70 3C 07 74 21
0200=BB 03 05 80 26 19 01 BF 3C 03 77 15 80 0E 19 01 40 26 8A 3E 62 04 B4 08 CD 10 8A DC 8A FC 80 F7
0220=77 89 1E A8 06 BF 30 00 26 8A 16 4A 04 80 EA 00 D0 EA 88 16 93 06 B6 00 32 D2 C6 06 C4 06 06 90
0240=A1 12 01 04 31 A2 A7 06 B9 CD BB E8 73 00 C6 06 A7 06 BA 90 B9 20 BA E8 67 00 FE 0E C4 06 75 EE
0260=C6 06 A7 06 C8 90 B9 CD BC E8 55 00 B9 78 05 E8 17 02 E8 ED 00 E4 60 3C 4F 74 07 83 3E 03 06 00
0280=75 F0 80 3E 18 01 FF 74 20 C6 06 18 01 FF B6 00 BE 30 00 B9 0D 00 8A 16 93 06 AD 8A DC E8 8B 00
02A0=E2 F8 FE C6 80 FE 08 75 EA E8 A8 00 A1 BC 06 26 89 07 FA B0 20 E6 20 80 0E 19 01 02 FB E8 1D 02
02C0=CF 8A 16 93 06 E8 1C 00 C6 06 18 01 0B 88 0E A7 06 E8 10 00 FE 0E 18 01 75 F3 88 2E A7 06 E8 03
02E0=00 FE C6 C3 E8 6D 00 26 89 17 26 8A 3E 62 04 B4 08 CD 10 F6 06 19 01 40 75 04 8A 26 A8 06 89 05
0300=47 47 A1 A7 06 F6 06 19 01 40 75 06 A8 80 74 02 B0 2A 8A 1E A8 06 E8 12 00 C3 A3 BE 06 AC 0A C0
0320=74 05 E8 06 00 EB F6 A1 BE 06 C3 89 0E C2 06 89 1E C0 06 E8 1E 00 26 89 17 88 1E C0 06 26 8A 3E
0340=62 04 B9 01 00 B4 09 CD 10 8B 1E C0 06 8B 0E C2 06 FE C2 C3 26 8A 1E 62 04 32 FF D1 E3 81 C3 50
0360=04 C3 E8 2B 00 80 3E 18 01 FF 74 23 B0 01 32 ED 8A 1E A8 06 8B F7 8A F5 80 C6 01 8A 16 93 06 FE
0380=C2 E8 96 FF 8B FE D0 C0 FE C5 80 FD 05 76 E1 C3 E8 3F 00 FE CB 78 3A D0 E3 D0 E3 D0 E3 D0 E3 E8
03A0=97 00 80 CB 0F E8 C7 00 E8 A4 00 B9 08 00 8A C1 FE C8 E8 BA 00 88 16 10 01 42 EC D0 E0 D0 E0 D0
03C0=E0 D1 E0 E2 E9 E8 97 00 E8 78 00 B0 01 8A CF D2 C0 C3 32 E4 A0 15 01 B5 06 F6 F5 8B D8 B5 48 F6
03E0=E5 BF 1B 01 03 F8 C3 80 FB FF 74 37 B9 FC 08 22 C4 74 03 B9 BC 02 E8 90 00 E8 3D 00 8A C4 E8 23
0400=00 80 CB 4F E8 68 00 E8 45 00 E8 52 00 8A C4 D0 E8 E8 10 00 80 F3 C0 E8 55 00 E8 32 00 E8 3F 00
0420=E8 20 00 C3 D0 C4 D0 C4 D1 C8 D0 C8 D1 C8 D0 C8 D1 C0 D1 C0 D0 CC D0 CC C3 88 16 10 01 EC 2E 88
0440=46 12 C3 2E 8A 46 12 88 16 10 01 E8 2D 00 C3 88 16 10 01 83 C2 02 EC 0C 02 24 F7 E8 1D 00 C3 8B
```

```
0460=16 10 01 83 C2 02 EC 24 FD 0C 08 E8 0D 00 C3 0C F8 22 C3 8B 16 10 01 E8 01 00 C3 EE C6 06 C4 06
0480=01 90 FE 0E C4 06 75 FA C3 F6 06 19 01 08 74 21 B0 B6 E6 43 8A C1 E6 42 8A C5 E6 42 E4 61 8A C8
04A0=0C 03 E6 61 8A C1 B9 00 50 86 C4 86 C4 E2 FA E6 61 C3 2E 8C 5E 02 2E 89 46 04 2E 89 76 06 2E 89
04C0=7E 08 2E 89 56 0A 2E 89 4E 0C 2E 89 5E 0E 2E 8C 46 10 BB 00 00 8E C3 8C CB 8E DB FC C3 2E 8E 46
04E0=10 2E 8B 5E 0E 2E 8B 4E 0C 2E 8B 56 0A 2E 8B 7E 08 2E 8B 76 06 2E 8B 46 04 2E 8E 5E 02 2E 8B 6E
0500=00 C3 12 2C 01 FB 9C 2E F6 06 19 01 05 74 6B 2E FE 0E 02 06 74 03 EB 62 90 2E 89 2E AA 06 BD AA
0520=06 E8 8E FF A0 15 01 04 01 3C 1E 72 02 B0 00 A2 15 01 B8 0C 00 B9 78 05 E8 4E FF C6 06 02 06 12
0540=83 3E 03 06 00 75 2C F6 06 19 01 02 74 05 80 26 19 01 FD 80 3E 16 01 00 74 1D FE 0E 16 01 A0 16
0560=01 A2 15 01 E8 29 FE F6 D0 22 E0 F6 D0 E8 77 FE EB 05 90 FF 0E 03 06 E8 63 FF 9D EA 00 00 00 00
0580=00 00 00 00 00 00 00 00 00 00 00 00 00 00 00 00 00 00 00 00 00 00 00 00 00 00 00 00 00 00 00 00
05A0=00 00 00 00 00 00 00 00 00 00 00 00 00 00 00 00 00 00 00 00 00 00 00 00 00 00 00 00 00 00 00 00
05C0=00 00 00 00 00 7F 00 87 DB 87 DB 87 DB 87 DB 90 0A 45 4C 45 43 54 52 49 43 20 4F 55 54 4C 45 54
05E0=20 49 52 51 20 52 4F 55 54 49 4E 45 20 20 43 6F 70 79 72 69 67 68 74 20 28 63 29 20 31 39 39 30
0600=20 48 75 67 6F 20 4F 72 74 69 7A 2E 20 41 6C 6C 20 72 69 67 68 74 73 20 72 65 73 65 72 76 65 64
0620=2E 0D 0A 46 6F 72 6D 61 74 3A 20 49 52 51 20 50 20 5B 2F 4E 78 78 5D 5B 2F 41 5D 5B 2F 57 5D 5B
0640=2F 42 5D 5B 2F 30 5D 5B 2C 5B 4C 41 42 45 4C 5D 2C 5B 4C 41 42 45 4C 5D 2E 2E 2E 5D 0D 0A 20 57
0660=68 65 72 65 3A 20 50 3D 50 61 72 61 6C 65 6C 6C 20 50 6F 72 74 20 4E 75 6D 62 65 72 20 28 31 2D
0680=33 29 0D 0A 20 20 20 20 20 20 20 20 4E 3D 50 72 65 66 69 78 20 66 6F 72 20 49 6E 74 65 72 72 75
06A0=70 74 20 4E 75 6D 62 65 72 0D 0A 20 20 20 20 20 20 20 78 78 3D 48 65 78 61 64 65 63 69 6D 61 6C
06C0=20 49 6E 74 65 72 72 75 70 74 20 4E 75 6D 62 65 72 20 28 46 20 66 6F 72 20 49 52 51 37 2C 20 44
06E0=20 66 6F 72 20 49 52 51 35 2C 20 64 65 66 61 75 6C 74 20 69 73 20 46 29 0D 0A 20 20 20 20 20 20
0700=20 20 41 3D 41 63 74 69 76 61 74 65 20 64 65 6C 61 79 20 61 6E 64 20 6F 75 74 6C 65 74 73 20 74
0720=75 72 6E 20 6F 66 66 0D 0A 20 20 20 20 20 20 20 20 57 3D 57 69 6E 64 6F 77 20 64 69 73 70 6C 61
0740=79 20 28 49 20 66 6F 72 20 69 6E 68 69 62 69 74 2C 20 54 20 66 6F 72 20 61 6C 6C 20 74 68 65 20
0760=74 69 6D 65 2C 20 57 20 77 68 65 6E 20 70 6F 73 73 69 62 6C 65 29 0D 0A 20 20 20 20 20 20 20 20
0780=42 3D 53 6F 75 6E 64 20 28 53 20 66 6F 72 20 73 69 6C 65 6E 74 2C 20 42 20 66 6F 72 20 62 65 65
07A0=70 29 0D 0A 20 20 20 20 20 20 20 20 30 3D 50 72 65 66 69 78 20 66 6F 72 20 73 65 63 6F 6E 64 73
07C0=20 74 69 6C 6C 20 6F 75 74 6C 65 74 73 20 6F 66 66 20 28 64 65 66 61 75 6C 74 20 69 73 20 33 30
07E0=30 29 0D 0A 20 20 20 20 4C 41 42 45 4C 3D 44 65 66 69 6E 69 74 69 6F 6E 20 6F 66 20 6C 69 6E 65
0800=20 69 6E 20 6D 65 73 73 61 67 65 20 77 69 6E 64 6F 77 20 28 31 31 20 63 68 61 72 61 63 74 65 72
0820=73 20 6F 72 20 6C 65 73 73 29 0D 0A 0A 41 6C 6C 20 76 61 72 69 61 62 6C 65 73 20 65 78 63 65 70
0840=74 20 50 20 61 72 65 20 6F 70 74 69 6F 6E 61 6C 0A 0A 0D 45 78 61 6D 70 6C 65 3A 20 49 52 51 20
0860=31 2F 4E 44 2F 53 2C 20 20 50 4C 45 41 53 45 2C 20 2C 20 20 20 20 50 41 59 2C 20 2C 20 41 54 54
0880=4E 54 49 4F 4E 0D 0A 20 20 57 69 6C 6C 20 69 6E 73 74 61 6C 6C 20 64 72 69 76 65 72 20 66 6F 72
08A0=20 50 61 72 61 6C 65 6C 6C 20 50 6F 72 74 20 31 2C 20 74 6F 20 72 65 73 70 6F 6E 64 20 74 6F 20
08C0=49 6E 74 65 72 72 75 70 74 20 30 44 48 2C 0D 0A 64 69 73 70 6C 61 79 20 77 69 6E 64 6F 77 20 73
08E0=69 6C 65 6E 74 6C 79 2C 20 77 69 74 68 20 74 68 65 20 6D 65 73 73 61 67 65 20 50 4C 45 41 53 45
0900=20 50 41 59 20 41 54 54 45 4E 54 49 4F 4E 20 69 6E 20 74 68 65 20 66 69 72 73 74 0D 0A 77 69 6E
0920=64 6F 77 24 1A 0D 0A 0A 52 65 73 69 64 65 6E 74 20 50 6F 72 74 69 6F 6E 20 41 6C 72 65 61 64 79
0940=20 49 6E 73 74 61 6C 6C 65 64 20 66 6F 72 20 50 6F 72 74 20 24 1A 0D 0A 0A 07 4E 6F 6E 65 78 69
0960=73 74 65 6E 74 20 50 61 72 61 6C 65 6C 6C 20 50 6F 72 74 24 1A 0D 0A 0A 07 49 6E 76 61 6C 69 64
0980=20 50 61 72 61 6C 65 6C 6C 20 50 6F 72 74 20 4E 75 6D 62 65 72 24 1A 0D 0A 0A 52 65 73 69 64 65
09A0=6E 74 20 50 6F 72 74 69 6F 6E 20 4E 6F 74 20 49 6E 73 74 61 6C 6C 65 64 24 1A 0D 0A 0A 52 65 73
09C0=69 64 65 6E 74 20 50 6F 72 74 69 6F 6E 20 49 6E 73 74 61 6C 6C 65 64 20 66 6F 72 20 50 6F 72 74
09E0=20 24 1A 0D 0A 49 6E 74 65 72 72 75 70 74 20 4E 75 6D 62 65 72 20 69 73 20 24 1A 01 F6 16 00 01
0A00=32 ED 2E 8A 0E 80 00 E3 3B 80 26 FB 0A FE 80 0E FB 0A 02 B4 20 E8 83 02 AC 3C 31 72 27 3C 33 77
0A20=23 2C 31 26 A3 12 01 80 26 FB 0A FD 06 D1 E0 88 F8 B8 40 00 8E C0 26 8B 45 08 07 0B C0 75 41 80
0A40=0E FB 0A 04 BA D0 06 B4 09 CD 21 B9 10 00 80 0E FB 0A 80 E8 B0 01 B4 09 BA 75 0A F6 06 FB 0A 04
0A60=74 03 BA 56 0A F6 06 FB 0A 01 75 05 CD 21 EB 08 90 F6 06 FB 0A 20 75 05 BA 97 0A CD 21 E9 5B 01
0A80=A3 10 01 B9 14 00 E8 7D 01 D0 26 FB 0A 26 80 26 19 01 B9 B4 2F E8 03 02 3C 00 75 03 EB 7C 90 AC
0AA0=3C 30 75 1F 33 DB AC 3C 30 72 11 3C 39 77 0D 2C 30 93 BA 0A 00 F7 E2 03 C3 93 EB EA 4E 89 1E 03
0AC0=06 B0 30 3C 54 75 06 26 80 26 19 01 CF 3C 57 75 0C 26 80 0E 19 01 20 26 80 26 19 01 EF 3C 49 75
0AE0=06 26 80 0E 19 01 10 3C 53 75 06 26 80 26 19 01 F7 3C 42 75 06 26 80 0E 19 01 08 3C 4E 75 03 E8
0B00=E0 00 3C 41 77 08 72 0A 26 80 0E 19 01 06 2C 20 EB B1 B4 2F E8 8E 01 E9 7E FF B4 2C E8 7C 01 3C
0B20=00 74 4C BB 1B 01 32 D2 33 FF 32 E4 2E A0 80 00 05 80 00 3B F0 77 19 AC 3C 2C 74 14 26 88 01 47
0B40=83 FF 0B 72 E5 33 FF B4 2C E8 59 01 3C 00 74 1F 83 FF 00 74 0B B0 20 26 88 01 47 83 FF 0B 72 F5
```

```
0B60=FE C2 3A 16 14 01 7F 07 83 C3 0C 33 FF EB BB A1 03 06 26 A3 03 06 A0 16 01 26 A2 16 01 1E 06 1F
0B80=BA 83 02 B4 25 A0 17 01 CD 21 1F F6 06 FB 0A 40 74 03 EB 3B 90 06 B4 35 B0 1C CD 21 89 1E 7C 06
0BA0=8C 06 7E 06 07 BA 05 06 B4 25 B0 1C CD 21 BA BA 0A E8 8F 00 32 F6 26 8A 16 C6 06 26 88 16 C5 06
0BC0=81 C2 D6 06 B1 04 D3 EA A0 FB 0A B4 31 CD 21 BA 25 0A E8 6E 00 26 80 26 19 01 FE B4 4C A0 FB 0A
0BE0=CD 21 AC E8 CB 00 3C 10 74 19 8A E0 AC E8 C1 00 86 E0 80 FC 10 74 08 8A DC B4 10 F6 E4 02 C3 26
0C00=A2 17 01 B0 21 C3 51 33 DB 8C C8 43 3B C3 8E C3 74 2F BE 00 01 8B FE 59 51 F3 A6 0B C9 75 EC 50
0C20=1E 06 1F AD 1F 3D 00 00 58 74 E0 2E 80 0E FB 0A 20 2E F6 06 FB 0A 80 74 08 BA 25 0A E8 04 00 EB
0C40=CA 59 C3 50 B4 09 CD 21 26 88 16 12 01 83 C2 31 B4 02 CD 21 BA E3 0A B4 09 CD 21 32 E4 26 A0 17
0C60=01 B2 10 F6 F2 E8 64 00 8A D0 8A C4 E8 5D 00 8A F0 80 FA 30 74 04 B4 02 CD 21 8A D6 B4 02 CD 21
0C80=52 BA 21 00 EC 24 7F EE 26 6B 16 10 01 42 42 EC 0C 10 EE 5A FA B0 20 E6 20 FB 58 32 ED 2E 8A 0E
0CA0=80 00 BE 81 00 AC 3A C4 74 04 E2 F9 32 C0 32 E4 C3 2C 30 3C 0A 72 14 2C 07 3C 10 72 08 2C 20 3C
0CC0=10 72 02 B0 10 3C 09 77 02 B0 10 C3 04 30 3C 3A 72 02 04 07 C3
```

SWITCH.COM                                                                NOTE: ALL NUMBERS ARE HEXADECIMAL

```
0000=E9 A5 0E 43 4F 50 45 4C 20 20 20 53 57 2D 30 37 00 00 00 00 1D 00 B8 08 02 FF 2C 00 20 20 20 53
0020=57 49 54 43 48 20 20 00 4B 65 79 73 20 74 6F 20 75 73 65 00 20 50 67 55 70 20 50 67 44 6E 20 00
0040=20 18 20 19 20 20 20 2B 20 2D 20 00 20 41 6E 20 69 6E 69 74 69 61 6C 00 20 54 61 62 20 20 45
0060=73 63 20 00 20 20 20 20 20 31 20 20 20 20 20 00 20 20 20 20 20 32 20 20 20 20 20 00 20 20 20 20 20 33
0080=20 20 20 20 00 20 20 20 20 20 34 20 20 20 20 00 20 20 20 20 20 35 20 20 20 20 20 00 20 20 20 20 20
00A0=36 20 20 20 20 00 20 20 20 20 20 31 20 20 20 20 00 20 20 20 20 20 32 20 20 20 20 00 20 20 20 20
00C0=20 33 20 20 20 20 00 20 20 20 20 20 34 20 20 20 20 00 20 20 20 20 20 35 20 20 20 20 00 20 20 20 20
00E0=20 20 36 20 20 20 20 00 20 20 20 20 20 31 20 20 20 20 00 20 20 20 20 20 32 20 20 20 20 00 20 20
0100=20 20 33 20 20 20 20 00 20 20 20 20 20 34 20 20 20 20 00 20 20 20 20 20 35 20 20 20 20 00 20
0120=20 20 20 20 36 20 20 20 20 00 20 20 20 20 20 31 20 20 20 20 00 20 20 20 20 20 32 20 20 20 20 00
0140=20 20 20 20 20 33 20 20 20 20 00 20 20 20 20 20 34 20 20 20 20 00 20 20 20 20 20 35 20 20 20 20
0160=00 20 20 20 20 20 36 20 20 20 20 00 FE 00 20 00 E8 9D 02 26 88 07 A3 D4 09 8B 3E 12 01 D1 E7 26
0180=8B 85 08 04 A3 10 01 F6 06 1A 01 10 74 03 E9 89 00 26 A0 49 04 24 7F F6 06 1A 01 20 74 03 3C 0A
01A0=77 78 80 0E 1A 01 40 BB 07 70 3C 07 74 21 BB 03 05 80 26 1A 01 BF 3C 03 77 15 80 0E 1A 01 40 26
01C0=8A 3E 62 04 B4 08 CD 10 8A DC 8A FC 80 F7 77 89 1E C0 09 BF 30 00 26 8A 16 4A 04 80 EA 0D D0 EA
01E0=88 16 AB 09 B6 00 32 D2 C6 06 DC 09 06 90 A1 12 01 04 31 A2 BF 09 B9 CD BB E8 81 01 C6 06 BF 09
0200=BA 90 B9 20 BA E8 75 01 FE 0E DC 09 75 EE C6 06 BF 09 C8 90 B9 CD BC E8 63 01 B9 78 05 E8 5F 03
0220=B0 1D 86 06 15 01 A2 14 01 E8 52 02 F6 C4 80 75 08 F6 C4 40 74 03 EB 0F 90 80 2E 15 01 06 80 3E
0240=15 01 06 72 02 EB E2 A0 15 01 86 06 14 01 A2 15 01 E8 CA 01 B4 01 9C 9A 00 00 00 00 74 F3 B4 00
0260=9C FF 1E 58 03 8A 1E 14 01 80 FC 50 75 11 FE 06 15 01 38 1E 15 01 76 05 C6 06 15 01 00 EB D2 80
0280=FC 51 75 12 80 06 15 01 06 38 1E 15 01 76 05 C6 06 15 01 00 EB BB 80 FC 48 75 0C FE 0E 15 01 79
02A0=04 88 1E 15 01 EB AA 80 FC 49 75 0D 80 2E 15 01 06 79 04 88 1E 15 01 EB 98 3C 2D 75 0E E8 BE 01
02C0=F6 D0 22 E0 F6 D0 E8 14 02 EB 86 3C 2B 75 0B E8 AC 01 0A E0 E8 06 02 E9 77 FF 80 FC 0F 74 49 3C
02E0=21 72 50 3C 7E 77 4C E8 88 00 8A F0 E8 D1 01 32 D2 8A C2 B9 0B 00 80 FB 00 75 03 83 C1 01 F6 E1
0300=03 C7 8B F0 AC 3C 20 77 02 E2 F9 E8 64 00 3A C6 74 0A FE C2 80 FA 06 72 D8 E9 35 FF B0 06 F6 E3
0320=02 C2 A2 15 01 E8 F6 00 E8 53 01 32 E0 E8 AD 01 E9 1E FF 80 FC 01 74 03 E9 16 FF B9 78 05 E8 3E
0340=02 80 3E 19 01 FF 74 20 C6 06 19 01 FF B6 00 BE 30 00 B9 0D 00 8A 16 AB 09 AD 8A DC E8 88 00 E2
0360=F8 FE C6 80 FE 08 75 EA E8 A5 00 A1 D4 09 26 89 07 C3 3C 60 72 06 3C 7B 77 02 2C 20 C3 8A 16 AB
0380=09 E8 1C 00 C6 06 19 01 0B 88 0E BF 09 E8 10 00 FE 0E 19 01 75 F3 88 2E BF 09 E8 03 00 FE C6 C3
03A0=E8 6D 00 26 89 17 26 8A 3E 62 04 B4 08 CD 10 F6 06 1A 01 40 75 04 8A 26 C0 09 89 05 47 47 A1 BF
03C0=09 F6 06 1A 01 40 75 06 A8 80 74 02 B0 2A 8A 1E C0 09 E8 12 00 C3 A3 D6 09 AC 0A C0 74 05 E8 06
03E0=00 EB F6 A1 D6 09 C3 89 0E DA 09 89 1E D8 09 E8 1E 00 26 89 17 88 1E D8 09 26 8A 3E 62 04 B9 01
0400=00 B4 09 CD 10 88 1E D8 09 8B 0E DA 09 FE C2 C3 26 8A 1E 62 04 32 FF D1 E3 81 C3 50 04 C3 E8 5D
0420=00 80 3E 19 01 FF 74 55 B0 01 32 ED 3A FD 8A 1E C0 09 75 04 8A 1E C1 09 8B F7 8A F5 80 C6 01 8A
0440=16 AB 09 FE C2 E8 8E FF 88 FE 80 3E 15 01 06 72 00 BE 6C 02 84 E0 75 03 BE 6E 02 E8 78 FF D0 C0
0460=FE C5 80 FD 05 76 C5 E8 56 00 8A C3 04 30 B6 00 8A 16 AB 09 FE C2 8A 1E C0 09 E8 6A FF C3 E8 3F
0480=00 FE CB 78 3A D0 E3 D0 E3 D0 E3 D0 E3 E8 9F 00 80 CB 0F E8 CF 00 E8 AC 00 B9 08 00 8A C1 FE C8
04A0=E8 C2 00 8B 16 10 01 42 EC D0 E0 D0 E0 D0 E0 D1 E0 E2 E9 E8 9F 00 E8 80 00 B0 01 8A CF D2 C0 C3
04C0=32 E4 A0 15 01 B5 06 F6 F5 8B D8 B5 42 F6 E5 BF 1C 01 3D 00 00 74 03 05 06 00 03 F8 C3 80 FB FF
04E0=74 37 B9 FC 08 22 C4 74 03 B9 BC 02 E8 90 00 E8 3D 40 8A C4 E8 23 00 80 CB 4F E8 68 00 E8 45 00
0500=E8 52 00 8A C4 D0 E8 E8 10 00 80 F3 C0 E8 55 00 E8 32 00 E8 3F 00 E8 20 00 C3 D0 C4 D0 C4 D1 C8
0520=D0 C8 D1 C8 D0 C8 D1 C0 D1 C0 D0 CC D0 CC C3 8B 16 10 01 EC 2E 88 46 12 C3 2E 8A 46 12 8B 16 10
```

```
0540=01 E8 2D 00 C3 8B 16 10 01 83 C2 02 EC 0C 02 24 F7 E8 1D 00 C3 8B 16 10 01 83 C2 02 EC 24 FD 0C
0560=08 E8 0D 00 C3 0C F8 22 C3 8B 16 10 01 E8 01 00 C3 EE C6 06 DC 09 01 90 FE 0E DC 09 75 FA C3 F6
0580=06 1A 01 08 74 21 B0 B6 E6 43 8A C1 E6 42 8A C5 E6 42 E4 61 8A C8 0C 03 E6 61 8A C1 B9 00 50 86
05A0=C4 86 C4 E2 FA E6 61 C3 2E 8C 5E 02 2E 89 46 04 2E 89 76 06 2E 89 7E 08 2E 89 56 0A 2E 89 4E 0C
05C0=2E 89 5E 0E 2E 8C 46 10 BB 00 00 8E C3 8C CB 8E DB FC C3 2E 8E 46 10 2E 8B 5E 0E 2E 8B 4E 0C 2E
05E0=8B 56 0A 2E 8B 7E 08 2E 8B 76 06 2E 8B 46 04 2E 8E 5E 02 2E 8B 6E 00 C3 FB 9C 50 E4 60 2E 3A 06
0600=16 01 75 12 2E F6 06 1A 01 02 74 0A 2E 80 26 1A 01 FD 58 EB 66 90 06 2E 3A 06 18 01 75 4D B8 00
0620=00 8E C0 26 A0 17 04 24 0F 2E 3A 06 17 01 75 3B 2E F6 06 1A 01 01 75 33 2E 80 0E 1A 01 03 E4 61
0640=8A E0 0C 80 E6 61 8A C4 E6 61 FA B0 20 E6 20 FB 07 58 2E 89 2E 98 09 BD 98 09 E8 4B FF E8 10 FB
0660=E8 70 FF 2E 80 26 1A 01 FE 9D CF 07 58 2E F6 06 1A 01 01 74 06 9D EA 00 00 00 00 9D EA 00 00 00
0680=00 50 B4 02 9C 9A 00 00 00 00 80 E4 7F 80 FC 10 2E A1 BB 07 2E A3 B9 07 58 74 18 2E 3B 1E 12 01
06A0=75 11 2E 83 3E BB 07 00 74 09 2E 80 0E 1B 01 02 E8 0A 00 2E FF 2E 86 07 08 00 00 4B 00 2E F6 06
06C0=1B 01 01 74 03 E9 8E 00 2E 80 0E 1B 01 01 2E 89 2E AC 09 BD AC 09 E8 CF FE 2E 8B 3E 12 01 D1 E7
06E0=26 8B 85 08 04 2E A3 10 01 2E A0 15 01 2E 86 06 B8 07 2E A2 15 01 E8 85 FD 2E F6 06 1B 01 02 75
0700=12 F6 D0 22 E0 F6 D0 E8 D3 FD 2E 80 26 1A 01 7F EB 2E 90 84 E0 75 29 0A E0 E8 C1 FD E8 38 00 75
0720=1F BE DF 09 32 ED 2E 8A 0E DE 09 E3 13 2E 8B 16 12 01 AC B4 00 9C 2E FF 1E 86 07 E2 F5 E8 17 00
0740=2E A0 15 01 2E 86 06 B8 07 2E A2 15 01 E8 83 FE 2E 80 26 1B 01 FE C3 2E 8B 16 10 01 42 2E 80 0E
0760=1A 01 80 BB 0F 00 B9 FF FF EC 0C 07 3C DF 74 12 49 83 F9 00 75 F3 4B 83 FB 00 75 EA 2E 80 26 1A
0780=01 7F C3 12 83 09 FB 9C 2E FE 0E 83 08 74 03 E9 90 00 2E C6 06 83 08 12 2E F6 06 1A 01 04 74 6A
07A0=2E 89 2E C2 09 BD C2 09 E8 FD FD FA 26 39 1E 26 00 75 15 A1 84 08 26 39 06 24 00 74 49 77 09 26
07C0=81 3E 24 00 83 09 73 60 8B 1E 84 08 81 FB 92 09 73 34 A1 7D 07 89 47 01 A1 7F 07 89 47 03 26 A1
07E0=24 00 A3 7D 07 26 A1 26 00 A3 7F 07 83 C3 05 89 1E 84 08 C7 47 01 F8 06 8C C8 89 47 03 26 89 1E
0800=24 00 26 A3 26 00 FB E8 C9 FD 2E F6 06 1A 01 80 74 10 2E FF 0E B9 07 75 09 2E 80 26 1B 01 FD E8
0820=9B FE 9D EA 00 00 00 00 26 8B 1E 24 00 8B 47 01 88 4F 03 C7 47 01 00 00 C7 47 03 00 00 83 C3 05
0840=3B 1E 84 08 74 09 89 47 01 89 4F 03 EB 08 90 A3 7D 07 89 0E 7F 07 B8 00 00 39 47 FE 75 A8 39 47
0860=FC 75 A3 8B 4F 01 89 47 01 89 4F FC 8B 4F 03 89 47 03 89 4F FE 83 EB 05 89 1E 84 08 26 89 1E 24
0880=00 EB D3 EA 00 00 00 00 EA 00 00 00 00 EA 00 00 00 00 EA 00 00 00 00 90 00 00 00 00 00 00 00 00
08A0=00 00 00 00 00 00 00 00 00 00 00 00 00 00 00 00 00 00 00 00 00 00 00 00 00 00 00 00 00 00 00 00
08C0=00 00 00 00 00 00 00 00 00 00 00 00 00 00 00 00 00 00 00 00 00 00 00 00 00 00 00 00 00 7F 00 90
08E0=0A 45 4C 45 43 54 52 49 43 20 4F 55 54 4C 45 54 20 53 57 49 54 43 48 20 20 20 20 20 20 20 43 6F
0900=70 79 72 69 67 68 74 20 28 63 29 20 31 39 39 30 20 48 75 67 6F 20 4F 72 74 69 7A 2E 20 41 6C 6C
0920=20 72 69 67 68 74 73 20 72 65 73 65 72 76 65 64 2E 0D 0A 46 6F 72 6D 61 74 3A 20 53 57 49 54 43
0940=48 20 50 20 5B 2F 4E 78 78 5D 5B 2F 57 5D 5B 2F 42 5D 5B 2F 4D 5D 5B 2F 30 5D 5B 2F 45 67 6F 5D
0960=5B 2F 46 67 6F 5D 5B 2C 5B 4C 41 42 45 4C 5D 2C 5B 4C 41 42 45 4C 5D 2E 2E 2E 5D 5B 2F 44 73 73
0980=5D 0D 0A 20 57 68 65 72 65 3A 20 50 3D 50 61 72 61 6C 6C 65 6C 20 50 6F 72 74 20 4E 75 6D 62 65
09A0=72 20 28 31 2D 33 29 0D 0A 20 20 20 20 20 20 20 20 4E 3D 48 6F 74 4B 65 79 20 65 6E 61 62 6C 65
09C0=20 6B 65 79 20 28 41 20 66 6F 72 20 41 6C 74 2C 20 43 20 66 6F 72 20 43 74 72 6C 2C 20 4C 2F 52
09E0=20 66 6F 72 20 53 68 69 66 74 2C 20 4E 20 66 6F 72 20 6E 6F 6E 65 29 0D 0A 20 20 20 20 20 20 20
0A00=78 78 3D 4B 65 79 62 6F 61 72 64 20 68 65 78 61 64 65 63 69 6D 61 6C 20 53 63 61 6E 20 43 6F 64
0A20=65 20 66 6F 72 20 48 6F 74 4B 65 79 20 28 31 2D 35 33 29 0D 0A 20 20 20 20 20 20 20 20 57 3D 57
0A40=69 6E 64 6F 77 20 64 69 73 70 6C 61 79 20 28 49 20 66 6F 72 20 69 6E 68 69 62 69 74 2C 20 54 20
0A60=66 6F 72 20 61 6C 6C 20 74 68 65 20 74 69 6D 65 2C 20 57 20 77 68 65 6E 20 70 6F 73 73 69 62 6C
0A80=65 29 0D 0A 20 20 20 20 20 20 20 20 42 3D 53 6F 75 6E 64 20 28 53 20 66 6F 72 20 73 69 6C 65 6E
0AA0=74 2C 20 42 20 66 6F 72 20 62 65 65 70 29 0D 0A 20 20 20 20 20 20 20 20 4D 3D 54 53 52 20 6B 65
0AC0=79 62 6F 61 72 64 20 6D 61 6E 61 67 65 6D 65 6E 74 20 28 55 20 66 6F 72 20 75 6E 6D 61 6E 61 6E
0AE0=65 64 2C 20 4D 20 66 6F 72 20 6D 61 6E 61 67 65 64 29 0D 0A 20 20 20 20 20 20 20 20 30 3D 50 72
0B00=65 66 69 78 20 66 6F 72 20 73 65 63 6F 6E 64 73 20 74 69 6C 6C 20 70 72 69 6E 74 65 72 20 6F 66
0B20=66 20 28 30 20 66 6F 72 20 76 6F 69 64 2C 20 64 65 66 61 75 6C 74 20 69 73 20 30 37 35 29 0D 0A
0B40=20 20 20 20 20 20 20 20 45 3D 50 72 65 66 69 78 20 66 6F 72 20 70 72 69 6E 74 65 72 20 6F 75 74
0B60=6C 65 74 20 28 64 65 66 61 75 6C 74 20 69 73 20 47 72 6F 75 70 20 31 2C 20 4F 75 74 6C 65 74 20
0B80=33 29 0D 0A 20 20 20 20 20 20 20 20 46 3D 50 72 65 66 69 78 20 66 6F 72 20 63 75 73 6F 72 20
0BA0=73 74 61 72 74 69 6E 67 20 70 6F 73 69 74 69 6F 6E 20 28 64 65 66 61 75 6C 74 20 69 73 20 47 72
0BC0=6F 75 70 20 30 2C 20 4F 75 74 6C 65 74 20 31 29 0D 0A 20 20 20 20 4C 41 42 45 4C 3D 44 65 66 69
0BE0=6E 69 74 69 6F 6E 20 6F 66 20 4F 75 74 6C 65 74 20 28 31 30 20 63 68 61 72 61 63 74 65 72 73 20
0C00=6F 72 20 6C 65 73 73 29 0D 0A 20 20 20 20 20 20 20 20 44 3D 50 72 65 66 69 78 20 66 6F 72 20 73
0C20=74 72 69 6E 67 20 6F 75 74 70 75 74 20 6F 6E 20 70 72 69 6E 74 65 72 20 73 74 61 72 74 2D 75 70
```

```
0C40=20 28 64 65 66 61 75 6C 74 20 69 73 20 6E 6F 6E 65 29 0D 0A 0A 41 6C 6C 20 76 61 72 69 61 62 6C
0C60=65 73 20 65 78 63 65 70 74 20 50 20 61 72 65 20 6F 70 74 69 6F 6E 61 6C 0A 0A 0D 45 78 61 6D 70
0C80=6C 65 3A 20 53 57 49 54 43 48 20 31 2F 41 30 32 2F 53 2C 43 6F 6D 70 75 74 65 72 2C 4D 6F 6E 69
0CA0=74 6F 72 2C 20 2C 2C 50 72 69 6E 74 65 72 0D 0A 20 20 57 69 6C 6C 20 69 6E 73 74 61 6C 6C 20 64
0CC0=72 69 76 65 72 20 66 6F 72 20 50 61 72 61 6C 65 6C 6C 20 50 6F 72 74 20 31 2C 20 74 6F 20 72 65
0CE0=73 70 6F 6E 64 20 74 6F 20 41 6C 74 2D 31 20 6B 65 79 20 63 6F 6D 62 69 6E 61 74 69 6F 6E 2C 0D
0D00=0A 64 69 73 70 6C 61 79 20 77 69 6E 64 6F 77 20 73 69 6C 65 6E 74 6C 79 2C 20 72 65 6E 61 6D 65
0D20=20 4C 61 62 65 6C 20 31 20 61 73 20 43 6F 6D 70 75 74 65 72 2C 20 4C 61 62 65 6C 20 32 20 61 73
0D40=20 4D 6F 6E 69 74 6F 72 2C 20 65 72 61 73 65 0D 0A 4C 61 62 65 6C 20 33 2C 20 6D 61 69 6E 74 61
0D60=69 6E 20 4C 61 62 65 6C 20 34 2C 20 72 65 6E 61 6D 65 20 4C 61 62 65 6C 20 35 20 61 73 20 50 72
0D80=69 6E 74 65 72 20 61 6E 64 20 6D 61 69 6E 74 61 69 6E 20 4C 61 62 65 6C 20 36 24 1A 0D 0A 0A 52
0DA0=65 73 69 64 65 6E 74 20 50 6F 72 74 69 6F 6E 20 41 6C 72 65 61 64 79 20 49 6E 73 74 61 6C 6C 65
0DC0=64 20 66 6F 72 20 50 6F 72 74 20 24 1A 0D 0A 0A 07 4E 6F 6E 65 78 69 73 74 65 6E 74 20 50 61 72
0DE0=61 6C 6C 65 6C 20 50 6F 72 74 24 1A 0D 0A 0A 07 49 6E 76 61 6C 69 64 20 50 61 72 61 6C 6C 65 6C
0E00=20 50 6F 72 74 20 4E 75 6D 62 65 72 24 1A 0D 0A 0A 52 65 73 69 64 65 6E 74 20 50 6F 72 74 69 6F
0E20=6E 20 4E 6F 74 20 49 6E 73 74 61 6C 6C 65 64 24 1A 0D 0A 0A 52 65 73 69 64 65 6E 74 20 50 6F 72
0E40=74 69 6F 6E 20 49 6E 73 74 61 6C 6C 65 64 20 66 6F 72 20 50 6F 72 74 20 24 1A 0D 0A 45 6E 61 62
0E60=6C 65 2B 48 6F 74 4B 65 79 20 63 6F 64 65 20 69 73 20 24 1A 0D 0A 07 54 6F 6F 20 6D 61 6E 79 20
0E80=63 68 61 72 61 63 74 65 72 73 20 6F 6E 20 70 72 69 6E 74 65 72 20 73 74 61 72 74 2D 75 70 20 73
0EA0=74 72 69 6E 67 24 1A 01 F6 16 00 01 32 ED 2E 8A 0E 80 00 E3 3B 80 26 A7 0F FE 80 0E A7 0F 02 B4
0EC0=20 E8 A9 03 AC 3C 31 72 27 3C 33 77 23 2C 31 26 A3 12 01 80 26 A7 0F FD 06 D1 E0 88 F8 B8 40 00
0EE0=8E C0 26 8B 45 08 07 0B C0 75 41 80 0E A7 0F 04 BA E0 09 B4 09 CD 21 B9 10 00 80 0E A7 0F 80 E8
0F00=B4 02 B4 09 BA EC 0E F6 06 A7 0F 04 74 03 BA CD 0E F6 06 A7 0F 01 75 05 CD 21 EB 08 90 F6 06 A7
0F20=0F 20 75 05 BA 0E 0F CD 21 E9 31 02 A3 10 01 B9 14 00 E8 81 02 D0 26 A7 0F B4 2F E8 2F 03 3C 00
0F40=75 03 E9 25 01 AC 3C 30 75 20 33 DB AC 3C 30 72 11 3C 39 77 0D 2C 30 93 BA 0A 00 F7 E2 03 C3 93
0F60=EB EA 4E 26 89 1E BB 07 B0 30 3C 44 75 28 2E 8A 0E 80 00 80 C1 81 2B CE 26 3A 0E DD 09 76 0A 26
0F80=8A 0E DD 09 80 0E A7 0F 08 BF DF 09 26 88 0E DE 09 F3 A4 E9 D4 00 3C 54 75 06 26 80 26 1A 01 CF
0FA0=3C 57 75 0C 26 80 0E 1A 01 20 26 80 26 1A 01 EF 3C 4D 75 06 26 80 0E 1A 01 04 3C 55 75 06 26 80
0FC0=26 1A 01 FB 3C 49 75 06 26 80 0E 1A 01 10 3C 42 75 06 26 80 0E 1A 01 08 3C 53 75 06 26 80 26 1A
0FE0=01 F7 3C 4E 75 0F 26 C6 06 17 01 00 26 C6 06 16 01 00 E8 99 01 3C 52 75 0F 26 C6 06 17 01 01 26
1000=C6 06 16 01 B6 E8 86 01 3C 4C 75 0F 26 C6 06 17 01 02 26 C6 06 16 01 AA E8 73 01 3C 43 75 0F 26
1020=C6 06 17 01 04 26 C6 06 16 01 9D E8 60 01 3C 45 75 09 E8 2F 01 75 2B 26 A2 B8 07 3C 46 75 09 E8
1040=22 01 75 1E 26 A2 15 01 3C 41 77 11 72 14 26 C6 06 17 01 08 26 C6 06 16 01 B8 E8 31 01 2C 20 E9
1060=08 FF B4 2F E8 10 02 E9 D4 FE B4 2C E8 FE 01 3C 00 74 4C BB 64 01 B2 06 33 FF 32 E4 2E A0 80 00
1080=05 80 00 3B F0 77 19 AC 3C 2C 74 14 26 88 01 47 83 FF 0A 72 E5 33 FF B4 2C E8 DB 01 3C 00 74 1F
10A0=83 FF 00 74 0B B0 20 26 88 01 47 83 FF 0A 72 F5 FE C2 3A 16 14 01 77 07 83 C3 0B 33 FF EB BB F6
10C0=06 A7 0F 40 74 09 26 80 26 1A 01 BE E9 88 00 06 B8 09 35 CD 21 89 1E 77 07 8C 06 79 07 89 1E 7D
10E0=07 8C 06 7F 07 B8 16 35 CD 21 89 1E 58 03 8C 06 5A 03 B8 17 35 CD 21 89 1E 86 07 8C 06 88 07 B4
1100=35 B0 1C CD 21 89 1E 24 09 8C 06 26 09 8C CA 2E 89 16 86 09 BA F8 06 2E 89 16 84 09 BA 83 09 B8
1120=09 25 CD 21 BA 81 07 B8 17 25 CD 21 BA 86 08 B4 25 B0 1C CD 21 07 BA 31 0F E8 B7 00 32 F6 26 8A
1140=16 DE 09 26 88 16 DD 09 81 C2 EE 09 B1 04 D3 EA A0 A7 0F B4 31 CD 21 BA 9C 0E E8 96 00 B4 4C A0
1160=A7 0F CD 21 B4 31 AC 3C 36 77 1F 3C 31 72 1B 8A D8 AC 3C 36 77 08 3C 31 72 04 8A E3 8A D8 B0 06
1180=80 EC 30 80 EB 31 F6 E4 02 C3 4E 0A E4 C3 AC E8 F1 00 3C 10 74 1D 8A E0 AC E8 E7 00 86 E0 80 FC
11A0=10 74 08 8A DC B4 10 F6 E4 02 C3 3C 53 77 04 26 A2 18 01 B0 21 C3 51 33 DB 8C C8 43 3B C3 8E C3
11C0=74 2F BE 00 01 8B FE 59 51 F3 A6 0B C9 75 EC 50 1E 06 1F AD 1F 3D 00 00 58 74 E0 2E 80 0E A7 0F
11E0=20 2E F6 06 A7 0F 80 74 08 BA 9C 0E E8 04 00 EB CA 59 C3 50 B4 09 CD 21 26 8B 16 12 01 83 C2 31
1200=B4 02 CD 21 BA 5A 0F B4 09 CD 21 B2 4E 26 80 3E 17 01 01 75 02 B2 52 26 80 3E 17 01 02 75 02 B2
1220=4C 26 80 3E 17 01 04 75 02 B2 43 26 80 3E 17 01 08 75 02 B2 41 B4 02 CD 21 32 E4 26 A0 18 01 B2
1240=10 F6 F2 E8 58 00 8A D0 8A C4 E8 51 00 8A F0 80 FA 30 74 04 B4 02 CD 21 8A D6 B4 02 CD 21 F6 06
1260=A7 0F 08 74 07 BA 74 0F B4 09 CD 21 58 32 ED 2E 8A 0E 80 00 BE 81 00 AC 3A C4 74 04 E2 F9 32 C0
1280=32 E4 C3 2C 30 3C 0A 72 14 2C 07 3C 10 72 08 2C 20 3C 10 72 02 B0 10 3C 09 77 02 B0 10 C3 04 30
12A0=3C 3A 72 02 04 07 C3
```

I claim:
1. An electric power controller, comprising:
 (a) a power input means for receiving electric power,
 (b) a power output means for releasing electric power,
 (c) a power control means connected intermediate the power input means and the power output means for permitting the flow of electricity from the power input means to the power outpost means responsive to a switch on signal and for disrupting said flow of electricity responsive to a switch off signal,
 (d) a computer interface means for allowing signals to pass between a parallel port of a computer and the controller, said computer interface means comprising a first conductor with means for connecting to a signal path of a first predetermined uutput pin of said parallel port and a second conductor with means for connecting to a signal path of a second predetermined output pin of said parallel port, and
 (e) a governing means connected to the computer interface means and the power control means for sending a switch on or switch off signal to the power control means responsive to a predetermined enable signal presented to the computer interface means, said enable signal comprising a low logic level on said first conductor and a high logic level on said second conductor, whereby such combination of logic levels allows the computer to power on and power off without causing false switching of the power controller.

2. The controller as defined in claim 1, where said first uutput pin is pin fourteen of said parallel port and said second output pin is pin seventeen of said parallel port, whereby the parallel port does not loose it's ability to control a printer.

3. The controller as defined in claim 1, further comprising:
 (a) said computer interface means further comprising a third conductor with means for connecting to a signal path of a third predetermined output pin of said parallel port,
 (b) said governing means comprising a three input nand gate and a three input nor gate, the output of said nand gate connected to one input of said nor gate,
 (c) said first conductor connected to another input of said nor gate,
 (d) said second conductor connected to one input of said nand gate, said third conductor connected to another input of said nand gate, and
 (e) said enable signal further comprising a high logic level on said third conductor.

4. The controller as defined in claim 1, further comprising a power supply means connected to the power input means providing direct current power to the governing means and the power control means.

5. The controller as defined in claim 1, further comprising:
 (a) a plurality of user switches individually connected in a predetermined manner to said governing means, and
 (b) said governing means sending said switch on or switch off signal to the power control means responsive to user direct control of any of said plurality of user switches.

6. The controller as defined in claim 1, further comprising:
 (a) said computer interface means including a third conductor with means for connecting to the signal path of a predetermined input pin of said parallel port, and
 (b) the governing means inform power status of the power output means by presenting a predetermined logic level on said third conductor.

7. The controller as defined in claim 1, where the power output means is electrically connected to at least one outlet of a multiple outlet power strip.

8. The controller as defined in claim 1, where the power output means is electrically connected to an outlet of an uninterruptible power supply.

9. The controller as defined in claim 1, further comprising the power output means is electrically connected to an outlet in a computer power supply.

10. The controller as defined in claim 1, where the power output means is electrically connected to an outlet of a personal computer.

11. The controller as defined in claim 1, further comprising:
 (a) a means for connecting an independent device to said governing means, and
 (b) said governing means sending said switch on or switch of signal to the power control means responsive to a predetermined signal in said means for connecting the independent device.

12. An electric power controller, comprising:
 (a) a power input means for receiving electric power,
 (b) a power output means for releasing electric power,
 (c) a power control means connected intermediate the power input means for permitting the flow of electricity from the power input means to the power output means responsive to a switch on signal and for disrupting said flow of electricity responsive to a switch off signal,
 (d) a computer interface means for allowing signals to pass between a parallel port of a computer and the controller, said computer interface means comprising a first conductor with means for connecting a signal path of a first predetermined output pin of said parallel port and a second conductor with means for connecting to a signal path of a second predetermined output pin of said parallel port; and
 (e) a governing means connected to the computer interface means and the power control means for sending a switch on or switch off signal to the power control means responsive to a predetermined enable signal presented to the computer interface means, said enable signal comprising a change in logic level on said first conductor followed by a change to the opposite logic level on said second conductor, whereby such combination of logic level changes allow the computer to power on and power off without causing false switching of the power controller.

13. The controller as defined in claim 12 where said first output pin is pin fourteen of said parallel port and said second output pin is pin seventeen of said parallel port, whereby the parallel port does not lose its ability to control a printer.

14. The controller as defined in claim 12, where said first output pin is pin seventeen of said parallel port and said second output pin is pin fourteen of said parallel port, whereby the parallel port does not lose its ability to control a printer.

15. The controller as defined in claim 12, further comprising:
   (a) said computer interface means including a third conductor with means for connecting to the signal path of a predetermined pin of said parallel port, and
   (b) the governing means for informing power status of the power output means by presenting a predetermined logic level on said third conductor.

16. A method of electric power flow management of a computer with a peripheral device comprising in combination the steps of installing an electric power controller between said peripheral device and an electric power source, connecting said electric power controller to a plurality of conductors of a parallel port of the computer for control of the peripheral device, and activating a routine in said computer memory to monitor demand on the peripheral device, upon sensing demand computer activating power flow through controller by means of a predetermined signal in said parallel port.

17. A method of electric power flow management according to claim 16, further comprising turning a first conductor of the parallel port to a low logic level and a second conductor of the parallel port to a high logic level in effecting said predetermined signal.

18. A method of electric power flow management according to claim 16, further comprising waiting a predetermined amount of time upon ceasing a demand on peripheral, and computer deactivating power flow through controller.

* * * * *

UNITED STATES PATENT AND TRADEMARK OFFICE
CERTIFICATE OF CORRECTION

PATENT NO. : 5,359,540

DATED : October 25, 1994

INVENTOR(S) : Hugo Ortiz

It is certified that error appears in the above-identified patent and that said Letters Patent is hereby corrected as shown below:

Column 6, line 32, a new paragraph begins after " (low) signals.".

Column 15, line 7, change " SWITCH 1,,,TV,,,Coffe Pot,Lamp" to "- SWITCH 1,,,,,,,,,,,,,,,,,,    TV,  , ,Coffee Pot,Lamp-".

Column 17, line 11, "A value of zero if the outlet was found to be off." is part (continuation) of the previous line.

Column 18, line 30, replace "IF ERRORLEVEL 1     GOTO END" for "-IF ERRORLEVEL 1 GOTO END-".

Column 18, line 33, add ". . ." at beginning of line.

UNITED STATES PATENT AND TRADEMARK OFFICE
CERTIFICATE OF CORRECTION

PATENT NO. : 5,359,540

DATED : October 25, 1994

INVENTOR(S) : Hugo Ortiz

It is certified that error appears in the above-identified patent and that said Letters Patent is hereby corrected as shown below:

Column 19, line 7, change "IF ERRORLEVEL 1      GOTO ERROR" to -- IF ERRORLEVEL 1 GOTO ERROR--.

Column 39, line 17, change "uuput" to --output--.
          line 35, change "loose" to --lose--.

Column 40, line 3, delete "input".
          line 5, after "means", insert --including means for--.
          line 5, change "inform" to --informing--.

Column 41, line 7, after "means", insert --including means--.
          line 16, change "peripheral device" to --electric power controller--.

Column 42, line 1, delete "memory".
          line 3, after "through", insert --the electric power--.
          line 12, delete "a".
          line 13, after "peripheral", insert --device--.
          line 14, after "through", insert --the electric power--.

Signed and Sealed this

Twenty-fifth Day of July, 1995

Attest:

BRUCE LEHMAN

*Attesting Officer*   Commissioner of Patents and Trademarks

UNITED STATES PATENT AND TRADEMARK OFFICE
CERTIFICATE OF CORRECTION

PATENT NO. : 5,359,540
DATED : October 25, 1994
INVENTOR(S) : Hugo Ortiz

It is certified that error appears in the above-indentified patent and that said Letters Patent is hereby corrected as shown below:

Column 40, line 34, insert --and the power output means--, after "means".

Column 40, line 42, insert --to--, after "connecting".

Signed and Sealed this

Tenth Day of October, 1995

Attest:

BRUCE LEHMAN

Attesting Officer    Commissioner of Patents and Trademarks